United States Patent [19]
Marshall et al.

[11] Patent Number: 5,594,468
[45] Date of Patent: Jan. 14, 1997

[54] OPTICAL SYSTEM AUXILIARY INPUT CALIBRATION ARRANGEMENT AND METHOD OF USING SAME

[75] Inventors: Roger N. Marshall, Solana Beach; Richard M. Lizon, Escondido; Jeffrey W. Busch, Sante; Lane T. Hauck, San Diego, all of Calif.

[73] Assignee: Proxima Corporation, San Diego, Calif.

[21] Appl. No.: 342,814

[22] Filed: Nov. 21, 1994

Related U.S. Application Data

[63] Continuation of Ser. No. 276,773, Jul. 18, 1994, abandoned, which is a continuation of Ser. No. 829,880, Feb. 3, 1992, abandoned, which is a continuation-in-part of Ser. No. 656,803, Feb. 14, 1991, abandoned, and a continuation-in-part of Ser. No. 611,416, Nov. 9, 1990, Pat. No. 5,181,015, which is a continuation-in-part of Ser. No. 433,029, Nov. 7, 1989, abandoned.

[51] Int. Cl.$^6$ ........................................ G09G 5/08
[52] U.S. Cl. ........................ 345/158; 345/87; 345/156; 348/744
[58] Field of Search ................... 345/7, 8, 9, 157, 345/156, 158, 183, 182, 180, 87; 348/211, 221, 229, 744, 745, 746, 747; 359/142, 443, 448, 449; 434/323, 324, 325, 337

[56] References Cited

U.S. PATENT DOCUMENTS

| | | |
|---|---|---|
| 3,885,096 | 5/1975 | Inuiya . |
| 4,280,135 | 7/1981 | Schlossberg . |
| 4,523,231 | 6/1985 | Therrien . |
| 4,750,041 | 6/1988 | Vogel et al. . |
| 4,846,694 | 7/1989 | Erhard . |

FOREIGN PATENT DOCUMENTS

| | | |
|---|---|---|
| 60-138628 | 7/1985 | Japan . |

*Primary Examiner*—Richard Hjerpe
*Assistant Examiner*—Xiao M. Wu
*Attorney, Agent, or Firm*—Bernard L. Kleinke

[57] ABSTRACT

A method and optical system auxiliary input calibration arrangement accurately and reliably discriminate between a user generated image and a video source generated image, such as one produced by a computer. The calibration arrangement includes amplifier devices for increasing the strength of a video information signal indicative of the video generated image, and a user generated auxiliary input signal indicative of an auxiliary input light image, without increasing spurious ambient light signals. A discrimination circuit generates a detection signal whenever the amplified information signals are greater than a predetermined reference level signal. A microprocessor calculates the appropriate predetermined reference level signal based upon ambient lighting conditions, the strength of that portion of the information signal indicative of the video image, the type of optical system and the distance the optical system is disposed away from a viewing surface. The microprocessor controls the exposure time of the light sensing device and selects an appropriate level of amplification for the output signal from the sensing device to increase light sensitivity between the video source generated light images as compared to the user generated auxiliary light images. A dual beam light generating device produces a low intensity laser beam for helping a user locate a desire portion of the video generated image and a high intensity laser beam for providing auxiliary input light of the desired position of the image illuminated by the low intensity beam.

39 Claims, 26 Drawing Sheets

OPTICAL SYSTEM AUXILIARY INPUT CALIBRATION ARRANGEMENT AND METHOD OF USING SAME

CROSS-REFERENCE TO RELATED APPLICATIONS

This is a Continuation of application Ser. No. 08/276,773, filed on Jul. 18, 1994, which is Continuation of application Ser. No. 07/829,880 filed on Feb. 3, 1992, now they both abandoned which is a continuation-in-part of U.S. patent application Ser. No. 07/656,803, filed Feb. 14, 1991 entitled "METHOD AND APPARATUS FOR CALIBRATING GEOMETRICALLY AN OPTICAL COMPUTER INPUT SYSTEM," now abandoned, and a continuation-in-part application of U.S. patent application Ser. No. 07/611,416, filed Nov. 9, 1990, now U.S. Pat. No. 5,181,015 entitled "METHOD AND APPARATUS FOR CALIBRATING AN OPTICAL COMPUTER INPUT SYSTEM," which is continuation-in-part applications of U.S. patent application Ser. No. 07/433,029 filed Nov. 7, 1989, entitled "COMPUTER INPUT SYSTEM AND METHOD OF USING SAME," now abandoned, all being incorporated herein by reference.

TECHNICAL FIELD

This invention relates to the general field of optical system auxiliary input calibration arrangement and the method of Using Such an arrangement. More particularly, the present invention relates to an optical calibration technique for use with an optical system auxiliary input for facilitating accurate communication of user generated optical information utilized for display purposes.

BACKGROUND ART

In one type of optical information system computer generated images are projected onto a screen for viewing by a large number of people simultaneously. An important aspect of such a system is to enable a user to enter information interactively into the system to modify images, or generate additional images during presentation.

In one successful arrangement, a user points a light generating device, such as a flashlight or laser pointer, at a projected image to provide auxiliary information for the system. In this regard, such a system generally includes a video information source, such as a computer, and a display projection arrangement, such as an overhead projector, for projecting images of the video information onto a viewing surface. An image processing arrangement detects and processes the displayed image reflecting from the viewing surface. Such a system detects the high intensity light images produced by the hand-held light generating device, and discriminates them from background ambient light as well as the light produced by the video information source. In this manner, light signals from the hand-held light generating device can be detected on the viewing surface, and then used by the system for modifying subsequently the projected video information. Such an optical auxiliary input system is described in greater detail in the above-mentioned U.S. patent application Ser. No. 07/433,029.

While such an optical system and method of using it has proven highly satisfactory, such a system must be calibrated to assure the accurate communication of the user generated high intensity light information. Such calibration includes using a calibration arrangement to align properly an optical sensing device associated with the image processing arrangement relative to the viewing surface and the projected images. Such a calibration arrangement and method of using it, are described in greater detail in the above-mentioned copending U.S. patent application Ser. No. 07/611,416.

While such a calibration arrangement and calibration method has proven highly satisfactory under low ambient lighting conditions, such as in a darkened room, it would be desirable to facilitate calibration of such an optical system under a wide variety of ambient lighting conditions, even bright ambient lighting conditions. Moreover, such a calibration technique should be able to be employed with many different types and kinds of optical systems generating images with substantially different luminance levels, as well as contrast levels between bright and dark images.

Such a calibration technique includes the proper alignment of the system, so that the viewing area of the system light sensing device is positioned properly to capture the entire computer generated projected image. Such alignment is desirable, because the viewing surface or screen of the system may be positioned at various distances and angular positions relative to the system light sensing device.

Also, the calibration of such a system entails sensitivity adjustments. Such adjustments are frequently necessary to accommodate for various projector light source intensities, different optical arrangements employed in conventional overhead projectors, and different optical characteristics exhibited by various liquid crystal display units employed in such systems. In this regard, calibration adjustments must be made to distinguish between the luminance levels of the various images reflecting from the viewing surface. Such adjustments however, are dependent upon several factors: the optical characteristics of the overhead projector including the power rating of projector lamps, the optical characteristics of the liquid crystal display unit employed, the distance the overhead projector is positioned from the viewing surface, and the intensity level of the user generated auxiliary images reflecting from the viewing surface.

Each of the above-mentioned factors directly affect the ability of the light sensing device to receive properly a reflected image, whether produced via the light generating pointing device or the projection display arrangement. In this regard, for example, if the overhead projector utilized in the projection display arrangement, is positioned a substantial distance from a viewing surface, the resulting image is large in size, but its overall luminance level is substantially reduced. Similarly, if an overhead projector employs a low intensity bulb, the projected image produced by the projector results in only a low luminance level.

Therefore, it would be highly desirable to have a new and improved calibration arrangement and method to calibrate the alignment, and improve the light sensitivity of an optical information system. Such an arrangement and method should enable a user to align conveniently the system optical sensing device to capture substantially the entire viewing area of a projected image. The arrangement and method should also enable the light sensitivity of the system to be adjusted so that it can be utilized with different types and kinds of liquid crystal display projection systems, employing different liquid crystal display panels and projection system.

Another form of light sensitivity calibration necessary for such an optical input information system, is a calibration adjustment to distinguish between ambient background light, light from the high intensity user controlled light generating device and the light produced from the video image reflecting from the viewing surface. In this regard, because of variations in ambient background lighting, as well as various different intensity levels of both the high intensity auxiliary control light image, and light produced by the projection system, it is, of course, desirable to distinguish properly the auxiliary light image on the viewing surface or screen, from the other light being reflected therefrom.

While the system has operated highly successful for many applications, it has been difficult, in some situations, to distinguish properly between the various light sources. For example, a light sensing device, such as a charge couple camera, must be positioned, not only in alignment to capture substantially the entire image reflecting from the viewing surface, but also it must be positioned in relatively close proximity to the viewing surface to produce a signal of sufficient potential to be processed for information extraction purposes.

Therefore, it would be highly desirable to have a new and improved calibration arrangement and method to calibrate the alignment and light sensitivity of an optical auxiliary input information system so that an adjustment can be made conveniently so the system produces a sufficient amount of light for information processing purposes.

Conventional charge couple cameras, by the nature of their sensitivity to different levels of light intensities, typically produce a "haystack" shaped waveform signal in response to sensing an image produced by a projection system, such as an overhead projector. The haystack signal is the resulting response developed because the scattered light source of the overhead projector typically emanates from a light bulb centrally disposed beneath the stage of the projector. Such a response thus, makes it difficult to accurately detect auxiliary light information reflecting at or near the boundaries of a reflected image.

Therefore, it would be highly desirable to have a new and improved calibration arrangement and method for discriminating accurately and reliably between various intensities of light reflecting from a viewing surface under a wide variety of conditions. Such arrangement and method should also discriminate between different beam intensities produced by an auxiliary input light generating device over a wide variety of distances.

DISCLOSURE OF INVENTION

Therefore, it is the principal object of the present invention to provide a new and improved arrangement and method for calibrating an optical system auxiliary input arrangement for proper alignment and light sensitivity for a wide variety of conditions.

Another object of the present invention is to provide such a new and improved optical system auxiliary input calibration arrangement and method to adjust the alignment and light sensitivity of an optical auxiliary input arrangement in a convenient manner so that the arrangement receives a sufficient amount of light for information processing purposes.

A further object of the present invention is to provide such a new and improved optical system auxiliary input calibration arrangement and method for discriminating accurately and reliably between various types of light sources associated with optical information systems.

Briefly, the above and further objects of the present invention are realized by providing a new and improved auxiliary input calibration arrangement and method for improved alignment and light sensitivity.

A method and optical system auxiliary input calibration arrangement accurately and reliably discriminate between a user generated image and a video source generated image, such as one produced by a computer. The calibration arrangement includes amplifier devices for increasing the strength of a video information signal indicative of the video generated image, and a user generated auxiliary input signal indicative of an auxiliary input light image, without increasing spurious ambient light signals. A discrimination circuit generates a detection signal whenever the amplified information signals are greater than a predetermined reference level signal. A microprocessor calculates the appropriate predetermined reference level signal based upon ambient lighting conditions, the strength of that portion of the information signal indicative of the video image, the type of optical system and the distance the optical system is disposed away from a viewing surface.

The microprocessor controls the exposure time of the light sensing device and selects an appropriate level of amplification for the output signal from the sensing device to increase light sensitivity between the video source generated light images as compared to the user generated auxiliary light images.

A dual beam light generating device produces both a low intensity laser beam for helping a user locate a desire portion of the video generated image and a high intensity laser beam for providing auxiliary input light of the desired position of the image illuminated by the low intensity beam.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
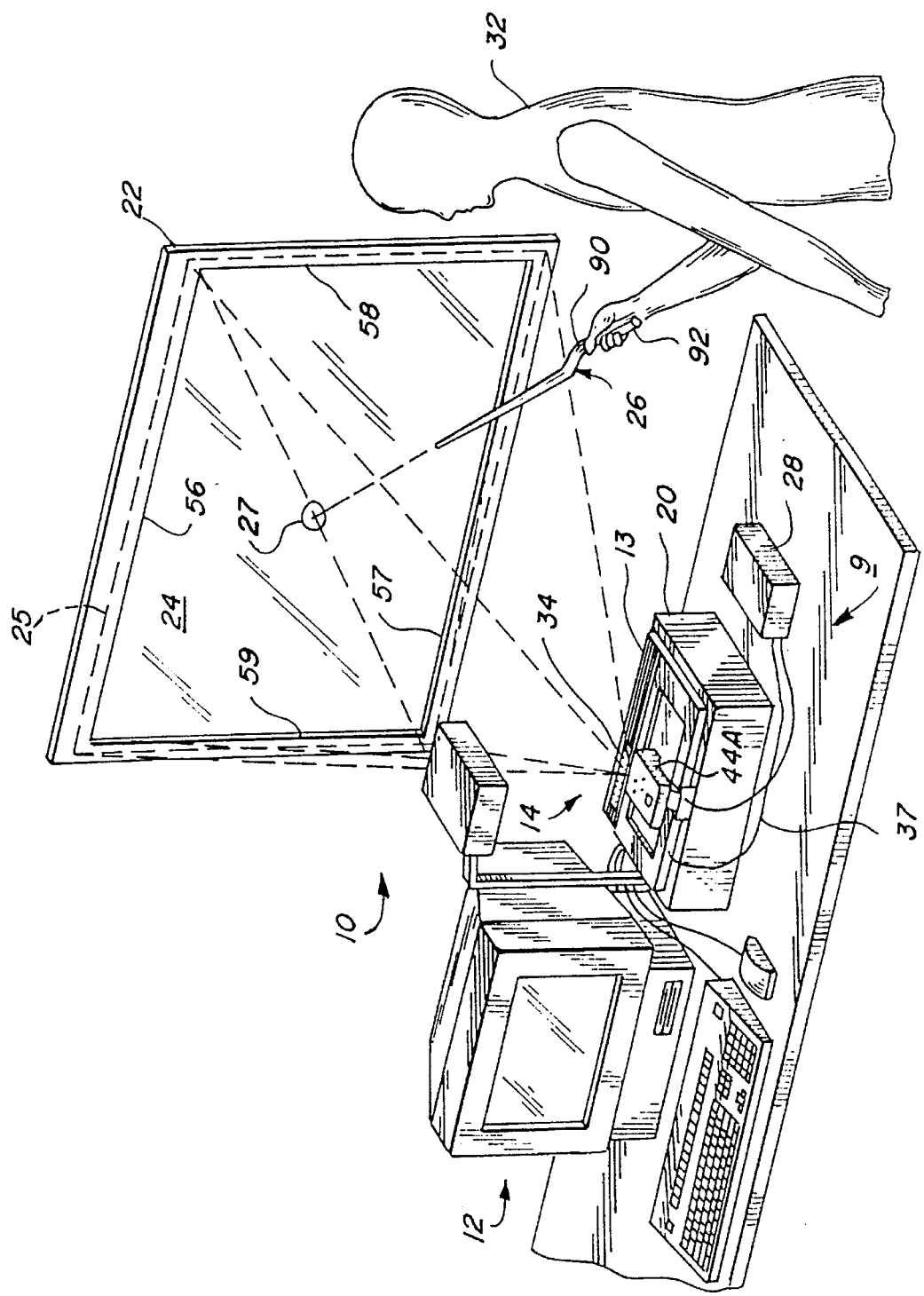
FIG. 1 is a pictorial view of a calibration arrangement, which is constructed according to the present invention, illustrating its use with an optical auxiliary input system.
Figure 2:
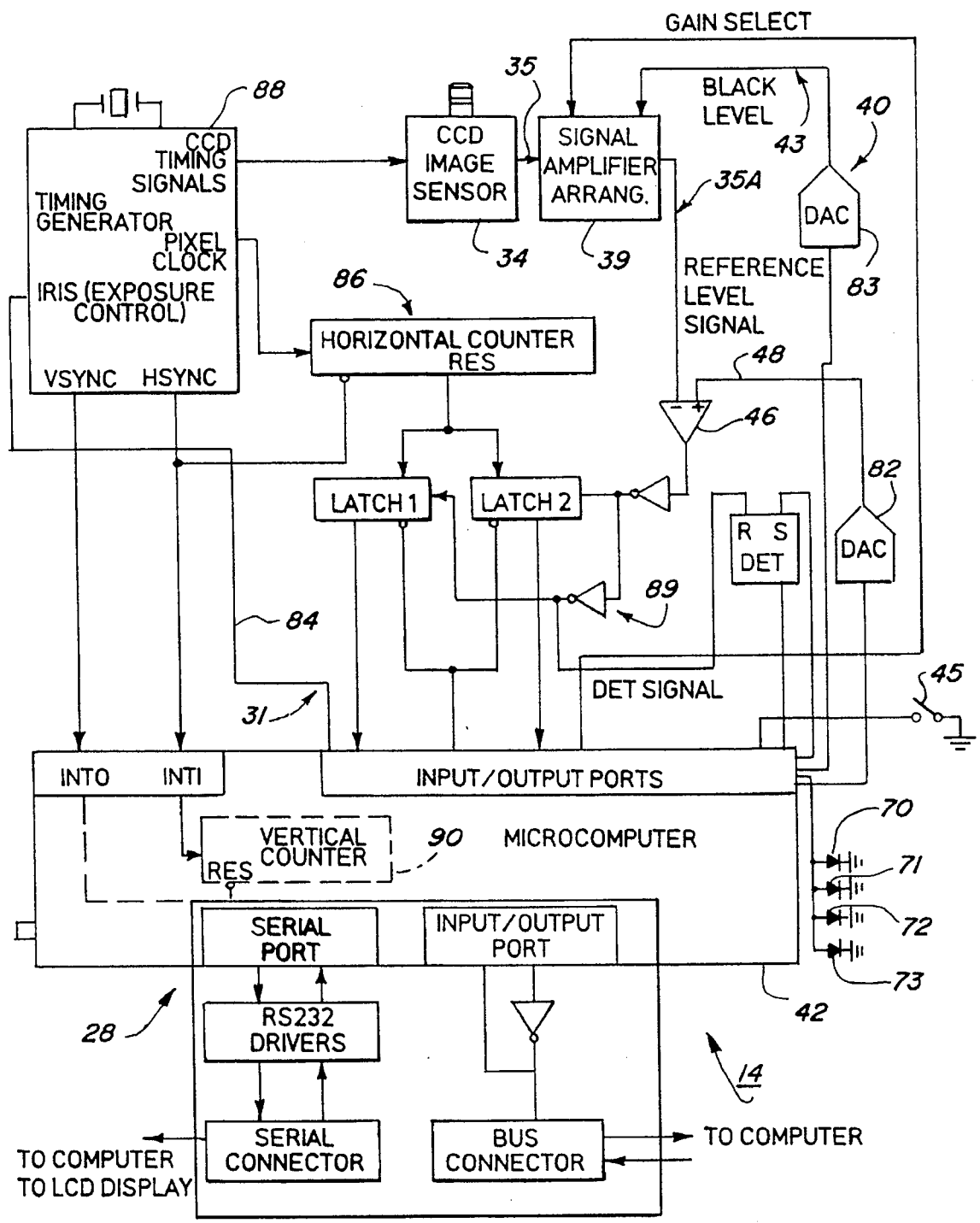
FIG. 2 is a symbolic block diagram of the calibration arrangement of FIG. 1 illustrating it coupled to an image processing apparatus forming part of the optical auxiliary input system of FIG. 1.

Referring now to the drawings, and more particularly to FIGS. 1 and 2, there is illustrated a calibration arrangement generally indicated at 9, for calibrating an optical auxiliary input system generally indicated at 10, and which is constructed in accordance to the present invention.

The optical auxiliary input system 10, is more fully described in the above mentioned U.S. patent application Ser. No. 07/433,029 and includes a video information source, such as a personal computer 12, and a liquid crystal display unit 13 for displaying a primary image 24 indicative of the primary image information generated by the computer 12. The liquid crystal display unit 13 is positioned on the stage of a projector, such as an overhead projector 20, for enabling the displayed primary image information to be projected onto a viewing surface, such as a screen 22.

The optical auxiliary input system 10 also includes an image processing apparatus 14 and a dual beam light generating device 26 for generating auxiliary light information, such as a spot of reflected light 27 for facilitating the modifying or changing of the primary image information displayed by the liquid crystal display unit 13.

The image processing apparatus 14 generally includes a light sensing device, such as a raster scan charge coupled device or camera 34 for generating a reflected light information signal 35 indicative of the luminance levels of the video images and other light reflecting from the surface of the screen 22, and a signal processing unit 28 (FIG. 2) coupled between the light sensing device 34 and the computer 12 by means (not shown) for converting the auxiliary light information generated by the device 26 into coordinate information to modify or change the displayed primary image information.

The light sensing device 34 as best seen in FIG. 1, has a field of view, indicated generally at 25, that is substantially larger than the primary image 24. In this regard, the calibration arrangement 9 helps a user 32 align the light sensing device 34 relative to the viewing screen 22, so that the field of view 25 of the device 34 is able to capture all of the displayed primary image 24 reflecting from the screen 22. The calibration arrangement 9, also helps facilitate adjusting the light sensitivity of image processing apparatus 14, so that the signal processing unit 28 can accurately and reliably process the auxiliary light information for use by the computer 12.

As best seen in FIG. 2, the calibration arrangement 9 generally includes a signal amplifier circuit, generally indicated at 39, for increasing the strength of the reflected light information signal 35 generated by the light sensing device 34 and a signal discrimination arrangement, generally indicated at 40, for discriminating auxiliary light information from the other information components in the reflected light information signal 35.

The signal discrimination arrangement 40 includes a comparator 46, for facilitating discriminating between signals indicative of the various sources of light reflecting from the viewing surface 22 and a microprocessor 42 (FIG. 2) for controlling a reference level signal 48 utilized by the comparator 46 for discrimination purposes. In this regard, for discrimination purposes, it should be understood that the light reflecting from the viewing surface 22, has a plurality of luminance levels generally including background ambient light, primary image light, such as the image 24, indicative of primary image information, and user 32 generated auxiliary image light, such as the spot of light 27, indicative of auxiliary light information.

The microprocessor 42 also controls the exposure time of the light sensing device 34, gain selection for the amplifier arrangement 39, and an offset black level signal 43 that will be described hereinafter in greater detail.

The calibration arrangement 9 further includes an interactive position device 44 having a set of light emitting diodes 70–73 for helping a user 32 to align the device 34 so that its field of view 25 captures the entire image 24 reflecting from the viewing surface 22. The positioning device 44 is more fully described in copending U.S. patent application Ser. No. 07/611,416 and will not be described in further detail.

For the purpose of calibration and alignment, the firmware of the microprocessor 42 includes a set of calibration algorithms to facilitate the alignment of the light sensing device 34 relative to the optical auxiliary input system 10. The calibration algorithms include a field of view alignment algorithm 100 for user interactive alignment of the light sensing device 34 under normal ambient and harsh ambient lighting conditions, and a light sensitivity algorithm 300 for adjusting the light sensitivity of the signal discrimination arrangement 40 for facilitating detection and tracking of auxiliary light images. Each of the above mentioned algorithms will be described hereinafter in greater detail.

Considering now the operation of the calibration arrangement 9, when the computer 12 commences generating video information, the liquid crystal display unit 13 generates an initiation signal that is coupled to calibration arrangement 9 via a control cable 37. The calibration arrangement 9, in response to the initiation signal, generates an audible sound by means not shown to notify the user 32 that he or she may now initiate the calibration process.

To start the calibration process, the user 32 depresses a calibration button 45 located on the positioning device 44. When the user 32 depresses the button 45 the calibration 9 apparatus via its program automatically instruct the user 32 through visual prompts via the light emitting diodes 70–73, how to position the device 44 so that the field of view 25 of the charge couple device 34 captures the entire image 24 reflecting from the viewing surface 22. In this regard, the field of view alignment algorithm 100 includes a normal alignment subroutine 150 that utilizes the edge portions of the reflected video image to align the device 34, and an alternative alignment subroutine 200 if the background ambient lighting condition are sufficiently harsh or if the luminance level of the reflected video image is sufficiently attenuated to prevent the normal alignment subroutine 150 to effectively align the device 34.

In the event the device 34 can not be aligned via the normal alignment subroutine 150, the calibration arrangement 9 generates a distinguishable audible sound to notify the user 32 that he or she must use the alternative method of alignment. In this regard, the user 32 must depress the button 45 again and then activate the light generating device 26 to cause a high intensity auxiliary light image, such as the light spot 27, to be reflected from the center of the projected image. The calibration arrangement 9 responds to the user via the alternative field of view alignment subroutine 200 by using the auxiliary light image 27 for aligning the light sensing device 34.

Regardless of which of the subroutines 150, 200 is utilized, both subroutines 150 and 200 cause the light emitting diodes 70–73 to turn on and off in various configurations to provide the user 32 with visual prompts for aligning the light sensing device 34 via the positioning device 44. Once the field of view 25 of the device 34 capture the center portion of image 24, all of the diodes 70–73 are de-energized to notify the user 32 that the device 34 is properly aligned.

Figure 3:
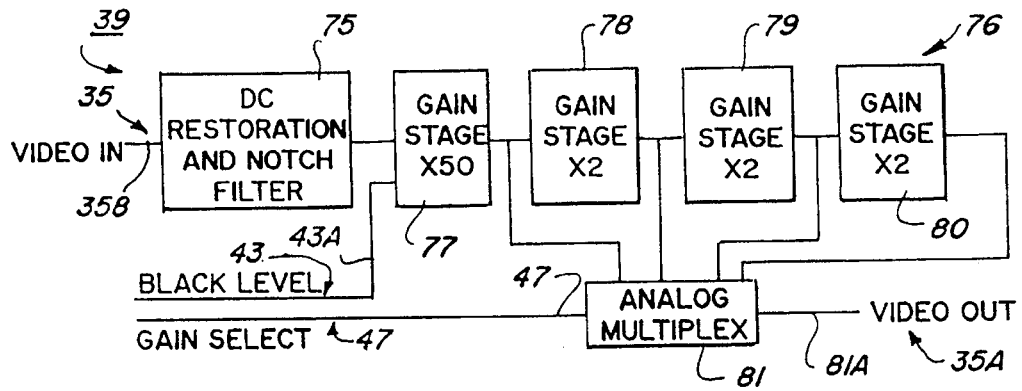
FIG. 3 is a symbolic block diagram of an amplifier device of the calibration arrangement of FIG. 2.

Once the device 34 has been properly aligned to capture the entire video image 24, the program initiates the light sensitivity procedures to set up the internal light sensitivity factors for the arrangement 40. Such internal light sensitivity factors include a black level factor determined by the voltage potential of the black level signal 43, a reference level factor determined by the voltage potential of the reference level signal 48, and a gain factor determined by the voltage potential of a gain select signal 47 (FIG. 3). Each of these factors will be described in greater detail hereinafter.

Once the sensitivity factors have been set up the user 32 causes a spot of light to be reflected on and off at each respective corner of the image 24, so the optical auxiliary input system 10 will be able to generate accurate and reliable coordinate information in response to detecting a spot of light produced by the device 26. This latter process is more fully described in copending U.S. patent application Ser. No. 07/611,416 and will not be described in further detail.

It should be understood however, that the above described technique enables the microprocessor 42 to be informed of the raster scan coordinate locations of the charge couple device 34 that correspond to the corner coordinate locations of the projected image. The microprocessor 42 then utilizes this acquired information to compute the conversion of the charge coupled coordinate location information into displayed image coordinate information that corresponds to pixel locations in the projected image 24. The method of computation is more fully described in copending U.S. patent application Ser. No. 07/656,803.

From the foregoing discussion, one skilled in the art, will understand that once the processing unit 28 has acquired the above mentioned calibration information, the optical auxiliary input system 10 via user generated auxiliary light images can supply auxiliary video information to the computer 12, which in turn, can generate primary video information that corresponds to the exact location of the auxiliary light image. Thus, prior to any video image being displayed by the display unit 13, via computer generated video information, the optical auxiliary input system 10 can generate in a completely asynchronous manner, independent auxiliary video information.

To align the charge couple device 34 so that its field of view captures the entire primary image 24, the microprocessor 42 generates an exposure rate or time signal 31 that causes the charge couple device 34 to produce the reflected light information signal 35. In this regard, if the exposure time selected for the charge coupled device 34 is not sufficient to enable the device 34 to generate an output signal of sufficient magnitude, the microprocessor 42 will increase the gain of the signal amplifier circuit 39 relative to the exposure time. The microprocessor 42 repeats this adjustment until proper gain and exposure time levels are determined.

The microprocessor 42 also causes the reference level signal to be set near zero to enable the output signal from the charge coupled device 34 to be passed by the comparator 46. In this regard, the signal passed by the comparator 46 is coupled to the microprocessor 42 in the form of coordinate information that enables the microprocessor 42 to determine the size of a captured image relative to certain prestored expected maximum and minimum coordinate value.

After comparing the coordinate information with the maximum and minimum values, the microprocessor 42 determines the direction the field of view 25 of device 34 needs to be adjusted to capture the entire image 24. After determining the correction factors, the microprocessor generates a set of signals which cause the light emitting diodes 70–73 to be turned on or off in a particular configuration thus, providing the user 32 with a visual indication of how to adjust the positioning device 44 so the field of view 25 will capture a greater portion of the image 24. This process is repeated iteratively until the entire image 24 is captured within the field of view 25 of device 34.

After the field of view 25 has been properly aligned, the microprocessor 42 adjusts light sensitivity. In this regard, the microprocessor 42 computes a reference level voltage that is sufficiently large to prevent low intensity auxiliary light information to be passed by the comparator 46, but that is not so large as to prevent high intensity auxiliary light information to be passed by the comparator 46.

Figure 34:
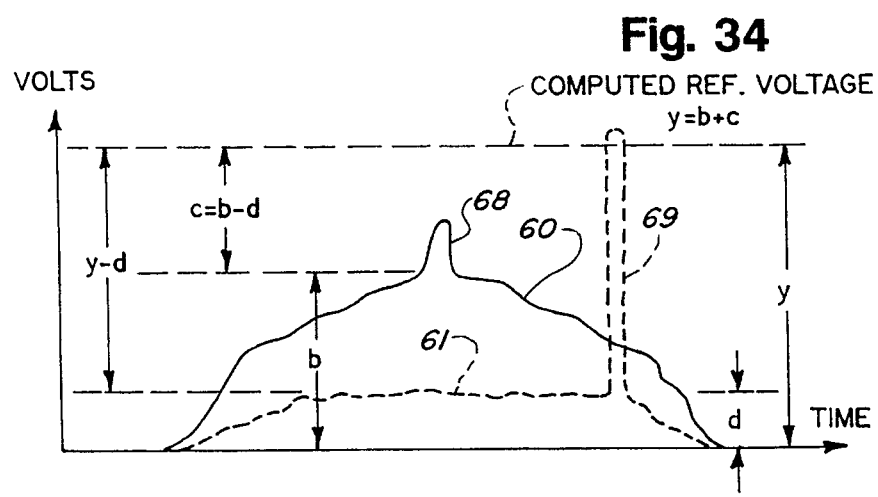
FIG. 34 is a graphical representation of the reflected light information signal generated by a light sensing device of FIG. 1.

In order to compute the desired reference level voltage, the microprocessor 42 generates a bright image signal that causes the display unit 13 to produce a bright, clear white image which causes, in turn, the charge couple device 34 to produce a bright image information signal 60 (FIG. 34). The microprocessor 42 then adjusts the reference level signal 48 to a sufficient level to prevent the bright image information signal 60 from being passed by the comparator 46. The bright image reference level voltage is indicated as b in FIG. 34.

Next the microprocessor 42 generates a dark image signal that causes the display unit 13 to produce a dark noncolored image which causes, in turn, the charge coupled device 34 to produce a dark image information signal 61 (FIG. 34). The microprocessor then adjusts the reference level signal 48 to a sufficient level to prevent the dark image information signal 61 from being passed by the comparator 46. The dark image reference level voltage is indicated as d in FIG. 34.

Next, the microprocessor 42 determines the model of the display unit 13 by communicating with the display unit 13 to obtain model number information. The microprocessor 42 utilizes the model number information to retrieve a set of adjustment factors that are utilized to compute the desired reference level voltage in accordance with the following formula:

$Y = mx + b$ = desired reference level voltage where:

$m$ = factor 1

$x = \left( \begin{array}{c} \text{reference level voltage} \\ \text{for bright image} \end{array} - \begin{array}{c} \text{reference level} \\ \text{voltage for dark image} \end{array} \right)$ $b = \left( \begin{array}{c} \text{reference level voltage} \\ \text{for bright image} \end{array} + \begin{array}{c} \text{factor 2} \\ \text{in volts} \end{array} \right)$ The above mentioned equation, expresses the relationship between the image information signals 60 and 61 for a given type of display unit and projection unit that enables the information signals resulting from a dual intensity auxiliary light beam, to be distinguished by the comparator 46.

From the foregoing, it will be understood that a low intensity auxiliary light beam can be displayed on any location of the projected image 24, without generating auxiliary light information. Such a low intensity beam can therefore help a user in locating a precise spot on the image 24 before illuminating that spot with high intensity light or with auxiliary light information. Table III illustrates various factors relative to a selected number of display units manufactured and sold by Proxima Corporation of San Diego, Calif.

Considering now the signal amplifier circuit 39 in greater detail with reference to FIGS. 2 and 3, the amplifier arrangement 39 is coupled between the light sensing device 34 and the comparator 46. The arrangement 39 generally comprises a direct current restoration and notch filter 75 having its input coupled via a conductor 35B, to the reflected light information signal 35 produced by the charge coupled device 34. The filter 75 helps remove extraneous noise from the reflected light information signal 35 before the signal is amplified and passed to the comparator 46.

The amplifier arrangement 39 also includes a four stage multiple gain circuit indicated generally at 76. The four stage multiple gain circuit 76 enables the reflected light information signal 35 to be amplifier to four discrete levels of 50, 100, 200 and 400 respectively. In this regard, the circuit 76 generally includes an input stage or multiple by 50 amplifier 77 coupled to the output of filter 75 and a set of series connected multiple by 2 amplifier stages 78, 79 and 80 respectively. The amplifier arrangement 39 also includes an analog multiplexer unit 81 coupled to the output of each one of the amplifier stages 77–80 for enabling selected ones of the stages 77–80 to be coupled to the comparator 46. In order to control which stage of the multiple gain circuit 76 will be coupled to the comparator 46, the multiplexer 81 is coupled via a conductor 47A to the gain select signal 47 produced by the microprocessor 42. The output of the analog multiplexer 81 is coupled to a video signal input 35A to the comparator 46 via a conductor 81A.

Figure 6:
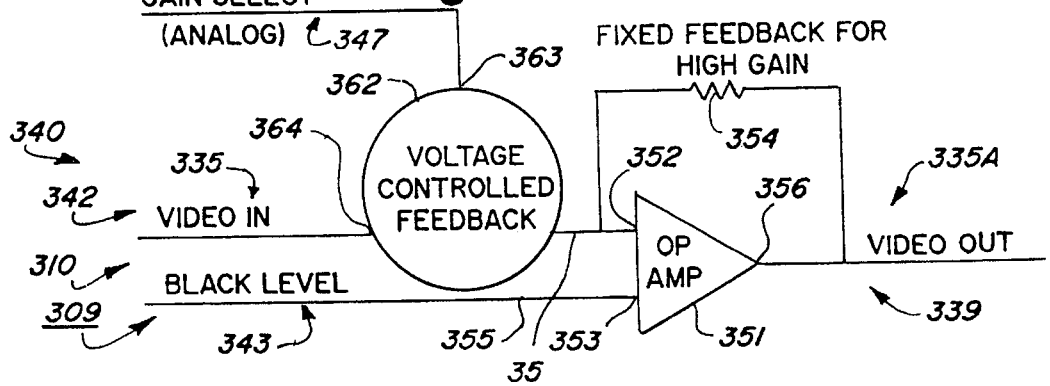
FIG. 6 is a symbolic block diagram of still yet another calibration arrangement, which is constructed in accordance with the present invention.
Figure 7:
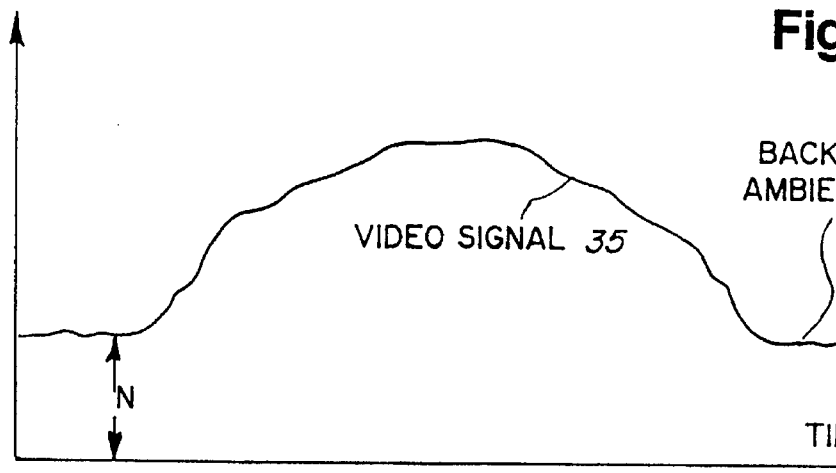
FIG. 7 is graphical representation of the reflected light information signal generated by the light sensing device of FIG. 1, illustrating the ambient background noise.
Figure 8:
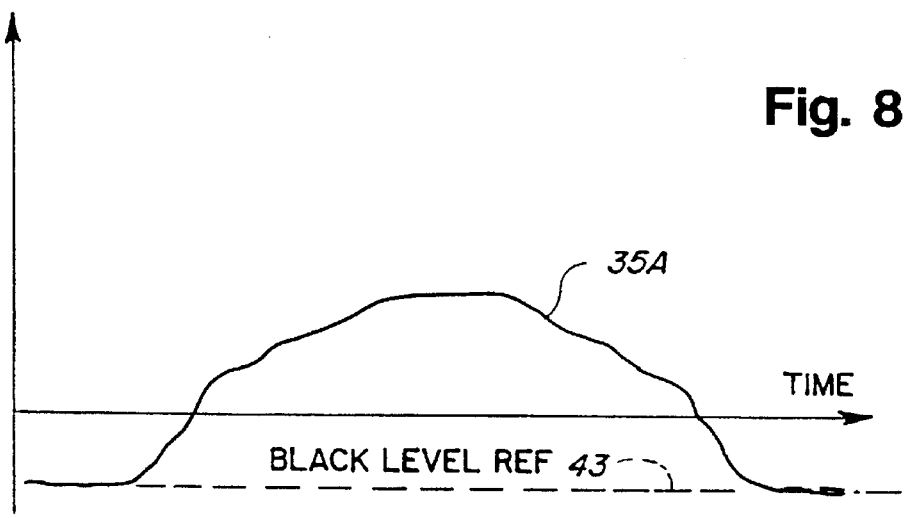
FIG. 8 is a graphical representation of the reflected light information signal of FIG. 1, illustrating an insufficient black level signal voltage setting.

In order to offset the output signal of the signal amplifier circuit 39 relative to the reflected light information signal 35, the input to the multiple by 50 amplifier 77 is coupled via a conductor 43A to the black level signal 43 produced by the microprocessor 42. In this regard, the black level signal 43 causes the reflected light information signal 35 to be raised and lowered relative to a zero volt reference level as best seen in FIGS. 6 to 8.

Considering now the signal discrimination arrangement 40 in greater detail with reference to FIG. 2, the microprocessor 42 controls the exposure time of the charge couple device 34, the reference level signal 48 for the comparator 46, and the black level and gain select for the signal amplifier circuit 39. In this regard, in order to convert the digital control signals produced by the microprocessor 42 to analog voltages, the signal discrimination arrangement 40 includes a set of digital to analog converters including a reference level signal converter 82 coupled to a positive input terminal of the comparator 46, and a black level signal converter 83 coupled to the input of the amplifier arrangement 39. The exposure time signal 31 is coupled directly to the timing generator 88 from the microprocess 42 via a conductor 84. As best seen in FIG. 2, the signal discrimination arrangement 40 also includes a counter arrangement 86 and a timing generator 88.

The counter arrangement 86 includes a horizontal counter and latching arrangement 89 and a vertical counter arrangement 90. The counter arrangement 86 is synchronized with the raster scan sequence of the charge coupled device by a pixel clock generated by the timing generator 88. In this regard, the microprocessor 42 and timing generator 88 cooperate together to control the exposure time and scanning sequence of the charge couple device 34. More particularly, they cooperate together so that the device 34 will produce an output signal of sufficient magnitude in response to the detection of light.

Figure 35:
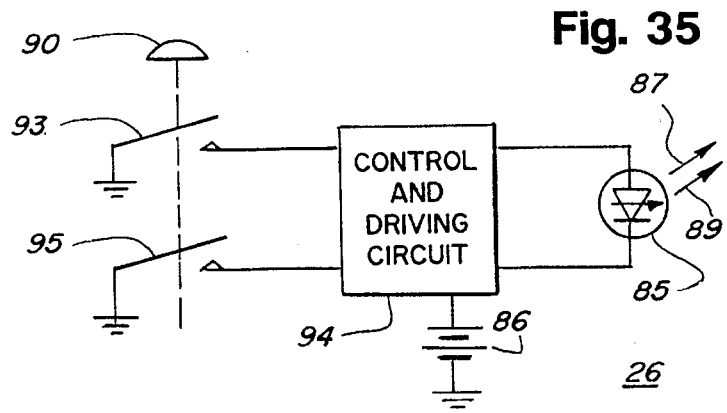
FIG. 35 is a schematic diagram of the dual beam light generating device of FIG. 1.

Considering now the light generating device 26 in greater detail with reference to FIGS. 1 and 35, the light generating device 26 include a laser 85 powered by a battery 86. The laser 85 produces a low intensity beam 87 for helping the user 32 locate a desired portion of the image to illuminate with the auxiliary light image 27 and a high intensity beam 89 for generating the auxiliary light image 27.

A dual position switch actuator indicated generally at 90 disposed on a handle 92 of the device 26 enables the user to switch beam intensities. The switch 90 include a low intensity light switch 93 and a high intensity light switch 95. In this regard, when the user 32 depress the actuator 90 to a first or low beam position, switch 93 is enabled, causing the device 26 to produce the low intensity beam 89. When the user 26 fully depresses the actuator 90 to a second or high beam position, switch 95 is enabled, causing the device 26 to produce the high intensity beam 89.

From the foregoing, it should be understood the low beam mode of operation enables the user 32 to easily and quickly locate desired portions of the image 24, without causing the generation auxiliary light information. Thus, once a desired location is determined, the user 32 merely further depresses the actuator 90 to generate the auxiliary light image.

Figure 13:
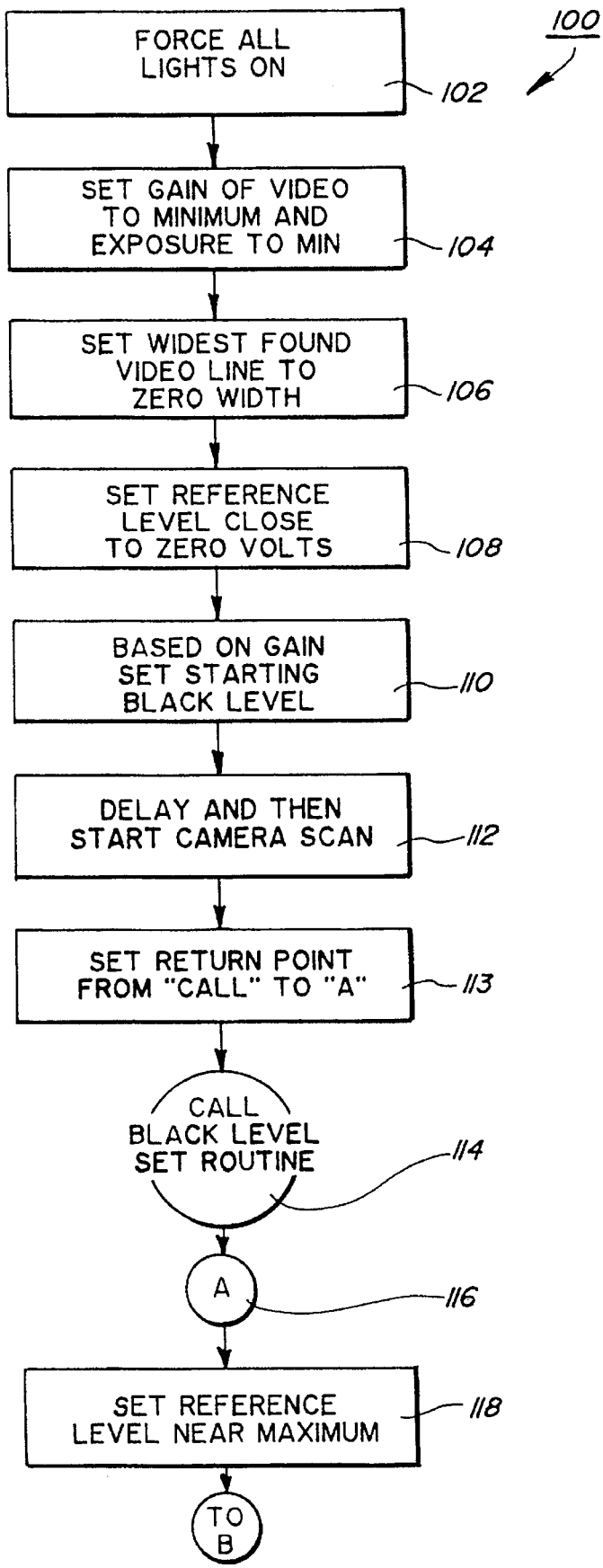
FIGS. 13 to 32 are flow diagrams of a program for a signal processing unit of FIG. 2.
Figure 14:
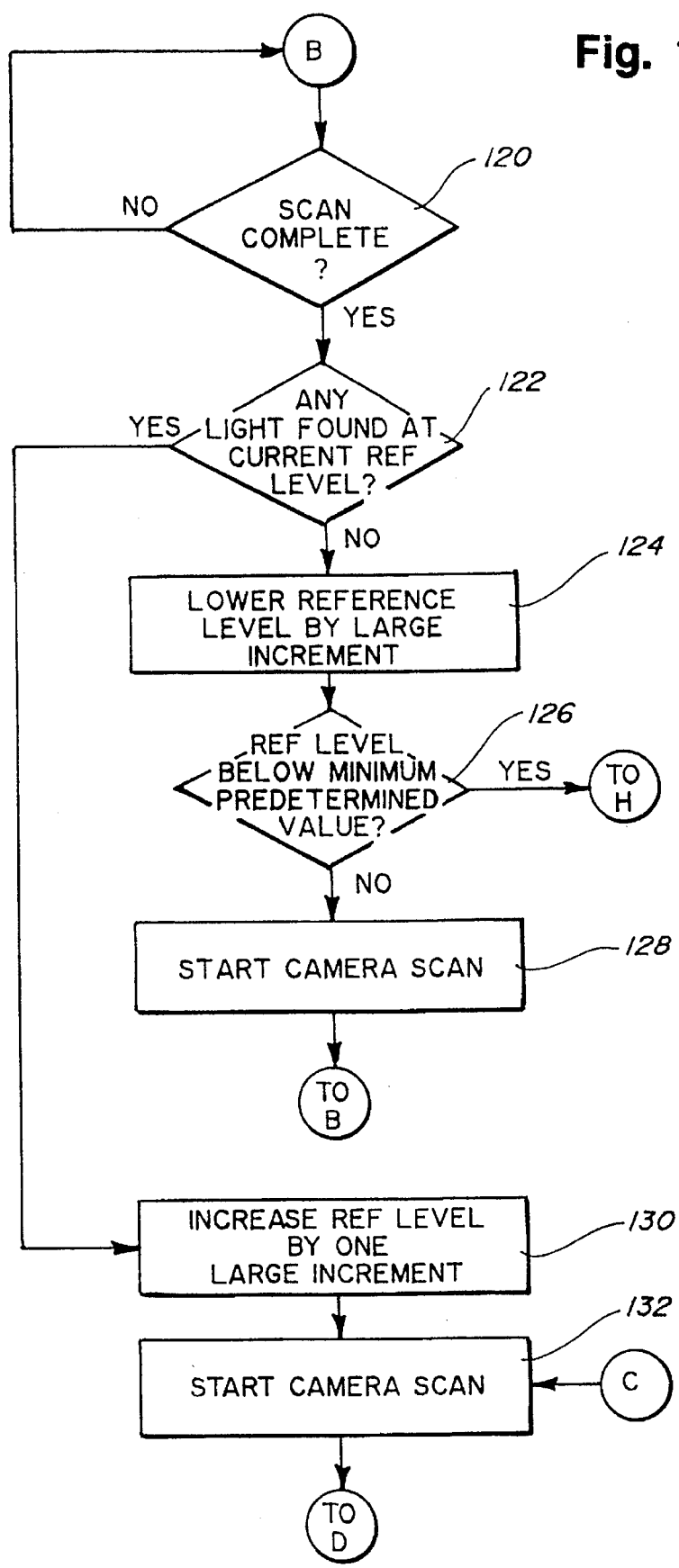
Figure 15:
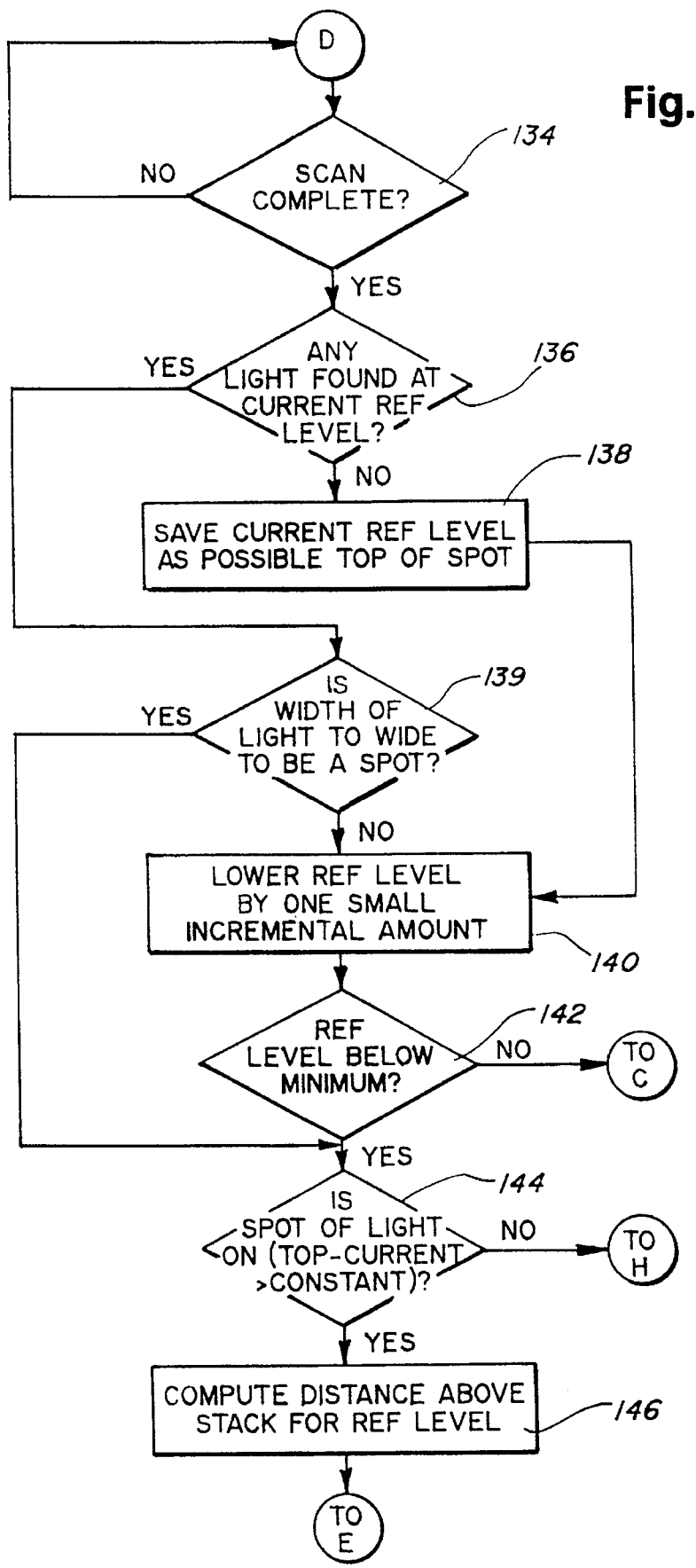

Considering now the field of view alignment algorithm 100 in greater detail with reference to FIG. 13, the algorithm 100 commences at an instruction 102 in response to a user 32 depressing the calibration button 45. Instruction 102 causes the microprocessor 42 to generate an initiation signal that in turn cause all of the light emitting diodes 70–73 to be illuminated. The configuration of all of the diodes being illuminated, informs the user 32 that either the normal alignment subroutine 150 or the alternative alignment 300 will be used to align the field of view of the device 34.

The program proceeds from instruction 102 to instruction 104 that causes the microprocessor 42 to generate a minimum gain control signal and a minimum exposure time signal which are coupled to the amplifier arrangement 39 and charge couple device 34 respectively. By setting the gain of the amplifier arrangement 39 to a minimum value, coupled with a minimum exposure time setting, assures that the calibration arrangement 9 will be able to detect the peak portions of reflected image information signal produced by the charge couple device 34. The peak portions include a primary information peak portion resulting from the computer generated image 24 and an auxiliary information peak portion resulting from any user 32 generated auxiliary light image 27 reflecting from the viewing surface 22.

The program then advances to an instruction 106 that causes an internal line width register (not shown) in the microprocessor 42 to be set to zero. The line width register is utilized to enable the calibration arrangement 9 to detect that portion of the reflected light information signal 35A which is indicative of the widest area of projected light.

The program proceeds to instruction 108 that causes the microprocessor 42 to set the reference level signal 48 near zero. Setting the reference level signal 48 near zero allow substantially any video signal produced via the amplifier arrangement 39 to be passed by the comparator 46. Thus, the zero reference level is a desired level for a black video image.

The program continues by causing an instruction 110 to be performed. In this regard, the microprocessor 42 generates a starting black level signal which is amplified by the amplifier arrangement 39 under minimum gain setting. The purpose of instruction 110 is to keep the elapse time for calibration purposes low. Thus, the starting black level and the incremental amount the black level is increased has been made gain dependent. In this regard, the black level adjustment has a range of 0 to 255 where 255 sets the black level at its lowest setting. Table I shows the gain and black level relationships.

TABLE I

| Gain Setting | Starting Black Level Setting | Increment |
|---|---|---|
| 1st lowest setting | 118 | 16 |
| 2nd lowest setting | 159 | 8 |
| 3rd lowest setting | 177 | 4 |
| Highest setting | 186 | 2 |

The program continues to an instruction 112 to initiate a scanning sequence by the charge couple device 34 after about a 60 millisecond delay. The 60 millisecond delay is to allow the system hardware to properly settle after a major change in either the black level, the exposure time or the voltage potential of the reference level signal.

Instruction 113 is executed next to set a return address indication to return location 116. After instruction 113 is executed, the system advances to a call instruction 114 that calls a black level set subroutine 500 (FIG. 32) that will be described hereinafter.

Figure 9:
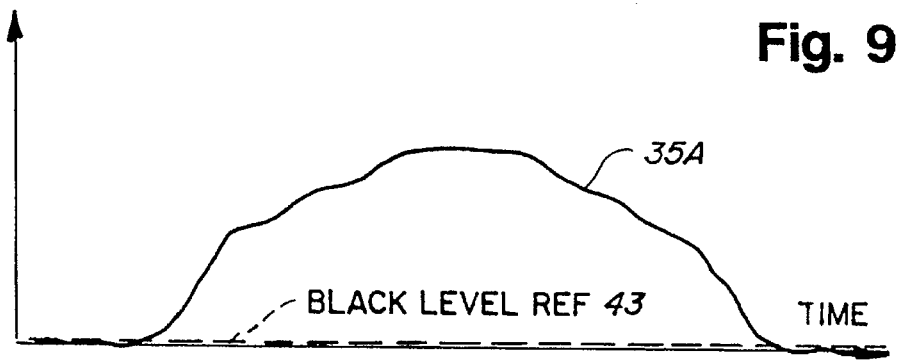
FIG. 9 is a graphical representation of the reflected light information signal of FIG. 7, illustrating a properly adjusted black level signal voltage setting.
Figure 10:
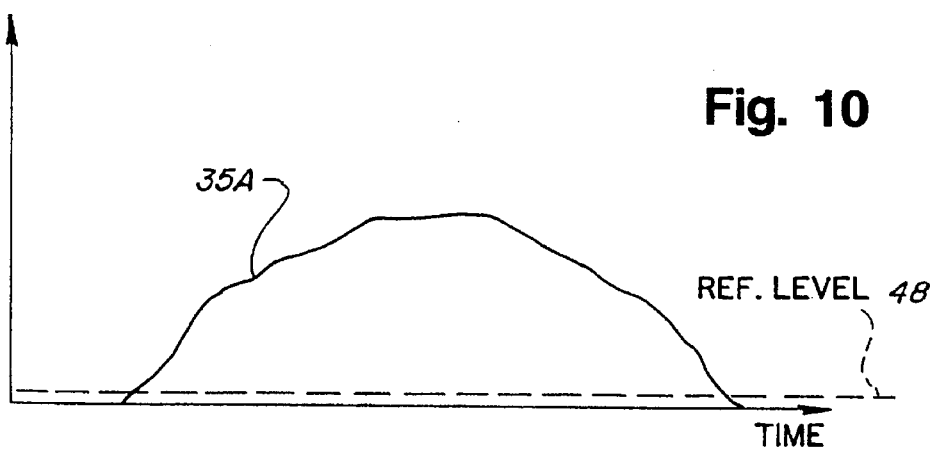
FIG. 10 is a graphical representation of the reflected light information signal generated by a light sensing device of FIG. 1 illustrating primary video information image.
Figure 11:
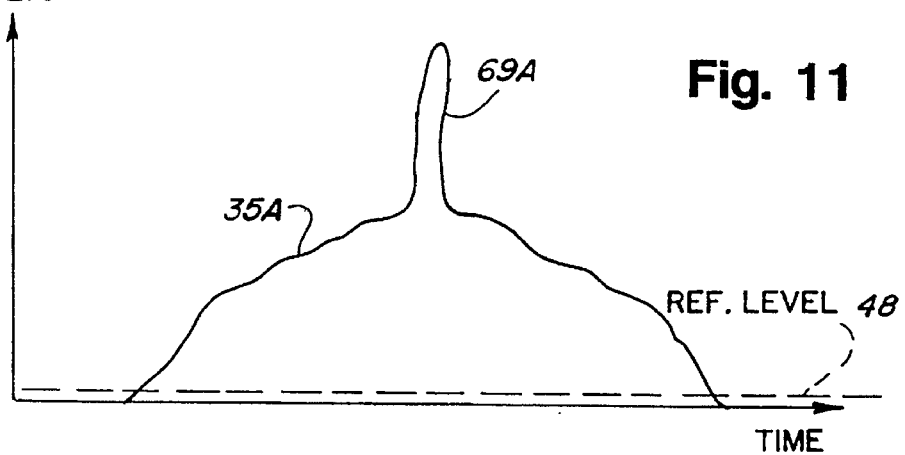
FIG. 11 is a graphical representation of the reflected light information signal generated by the light sensing device of FIG. 1 illustrating both primary video image information and auxiliary image information.
Figure 12:
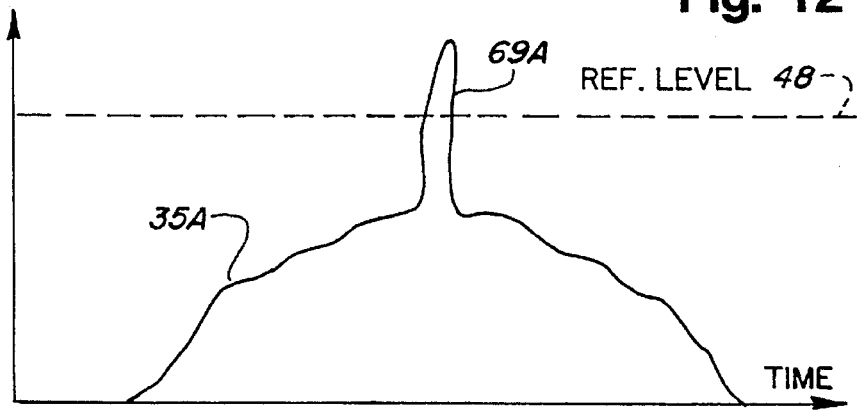
FIG. 12 is a graphical representation of the reflected light information signal of FIG. 11, illustrating a discriminating reference level voltage.

When the black level set routine 500 is executed, the black level signal 43 is adjusted to near zero volts by first setting the black level high and then causing the black level signal 43 to be decreased until the widest video signal is found. FIG. 7 illustrates the reflected light information signal 35A received by the comparator 46, where a starting black level voltage setting is substantially above the reference level. FIG. 9 illustrates an adjusted black level signal with a corresponding widest video signal 35A. FIG. 8 illustrates information signal 35A received by the comparator 46, where the black level voltage setting is substantially below the reference level.

After the black level set routine 500 has been executed, the program returns to return location 116 and proceeds to an instruction 118. At instruction 118, the microprocessor 42 sets the reference level signal 48 near its maximum value in order to initiate a search for the presence of auxiliary light information. More particularly, the program seeks to determine whether the user 32 has initiated the alternative field of view calibration process by activating the light generating device 26.

After the reference level signal 48 has been set near its maximum level, the program proceeds to a decision instruction 120 to determine whether the charge couple device 34 has completed its scan. If the scan has not been completed, the program waits at instruction 120 until the scan is completed.

When the scan sequence is completed, the program advances to a decision instruction 122 to determine whether any light was captured during the scan. If no light was detected, the program goes to an instruction 124 that causes the voltage of the reference level signal 48 to be decreased by about 0.5 volts; i.e. one large incremental value. The program then proceeds to a decision instruction 126 to determine whether the reference level signal 48 has been decreased below a predetermined minimum value.

If the reference level signal 48 has been set below the predetermined minimum value, the program proceeds to the normal field of view alignment subroutine 150. If the reference level signal 48 has not been set below the predetermined minimum value, the program goes to an instruction 128 that causes the light sensing device 34 to initiate another scanning sequence. After the scanning sequence has been started, the program returns to the decision instruction 120 and proceeds as previously described.

At the decision 122, the program advances to an instruction 130 if light was detected at the present voltage potential for the reference level signal 48. At instruction 130, the voltage of the reference level signal 48 is increased by about 0.5 volts. In other words, the voltage of the reference level signal 48 is set at a level where light was not detected.

After increasing the voltage level of the reference level signal 48, the program proceeds to an instruction 132 that causes the light sensing device 34 to commence another scanning sequence. The program then goes to a decision instruction 134.

At decision instruction 134, the program determines whether the last initiated scanning sequence has been completed. If the sequence has not been completed, the program waits at decision 134.

When the scanning sequence has been completed, the program advances to a decision instruction 136 to determine whether any light has been detected at the present reference level voltage. As instruction 130 previously set the voltage of the reference level signal 48 at a sufficiently high level to prevent the detection of light, no light will be found during this scan sequence. The program therefore advances to an instruction 138.

At instruction 138, the microprocessor 42 causes the value of the current reference level voltage to be saved as a possible reference level voltage that is indicative of the peak of the auxiliary light image. After the value of the reference level voltage has been saved, the program goes to an instruction 140. At instruction 140 the microprocessor 42 causes the voltage of the reference level signal 48 to be decreased by about 0.1 volts, i.e. one small increment.

After the value of the reference level voltage has been decreased, the program advances to a decision instruction 142 to determine whether the reference level signal 48 is below a predetermined minimum value. If the value is not below the predetermined value, the program returns to instruction 132 and proceeds as previously described.

If the value of the reference level signal 48 is below the predetermined minimum value, the program proceeds to a decision 144 to determine whether an auxiliary light image has been detected. In this regard, the microprocessor 42 determines whether the previously saved reference level voltage less the present reference level voltage is greater than a predetermined constant. If the auxiliary light image has not ben detected, the program proceed to the normal alignment subroutine 150.

If the decision instruction 144 determines that an auxiliary light image has been detected, the program goes to an instruction 146 and computes the strength of the auxiliary light image from the following formula:

$$\text{Strength of Auxiliary Light Image} = \frac{\text{Previously Stored Reference Voltage} - \text{Current Reference Voltage}}{2} \cdot \frac{\text{Current}}{\text{Current} + \text{Reference Voltage}}$$

After the strength of the auxiliary light image has been computed, the program proceeds to an instruction 148. The instruction 148 causes the display unit 13 to override the computer generated video image. In this regard, the projected images go to a blank image and then back to the computer generated image. This "flashing" sequence notifies the user 32 that the auxiliary light image has been detected and that alignment of the charge couple device 34 will proceed using the alternative alignment subroutine 200.

Figure 16:
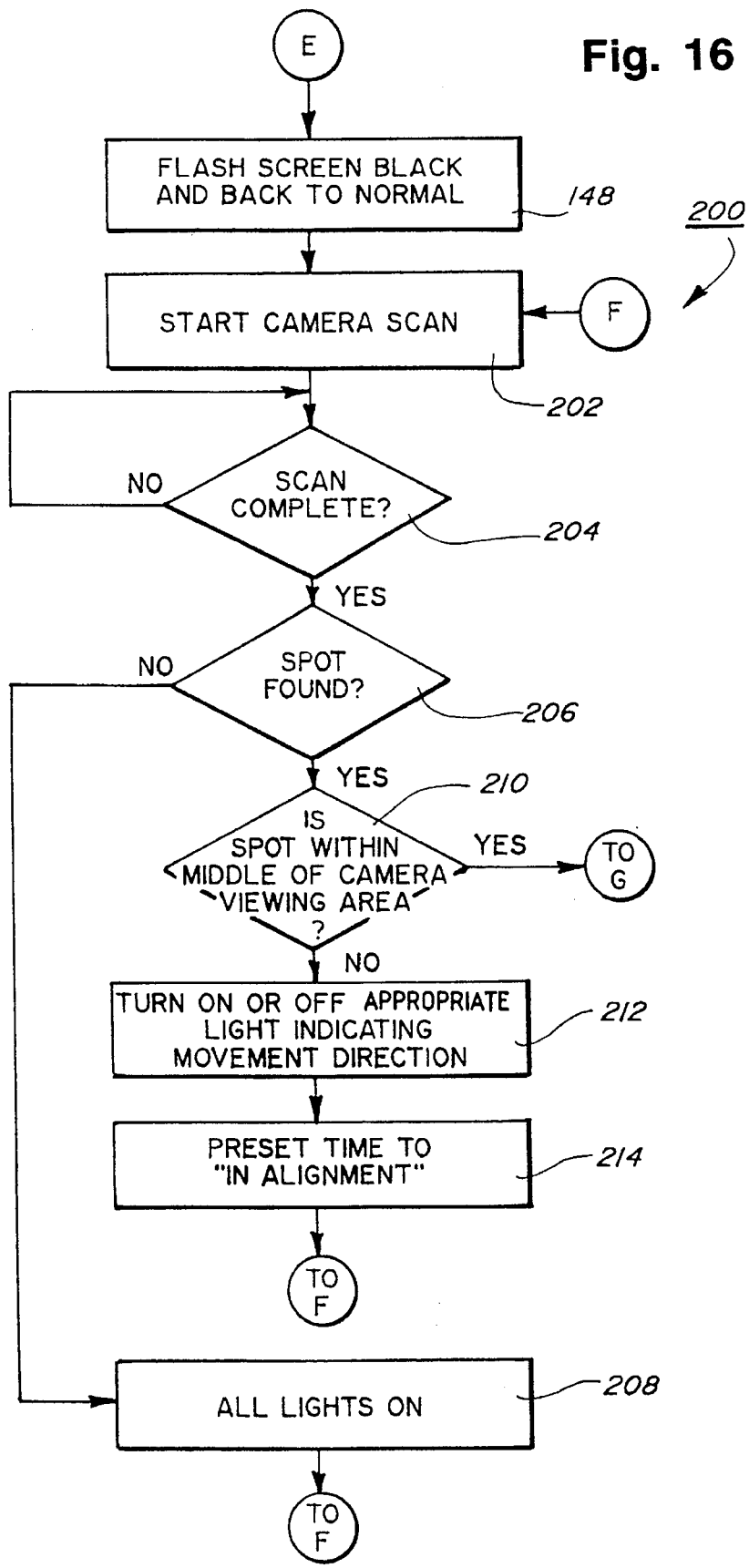
Figure 17:
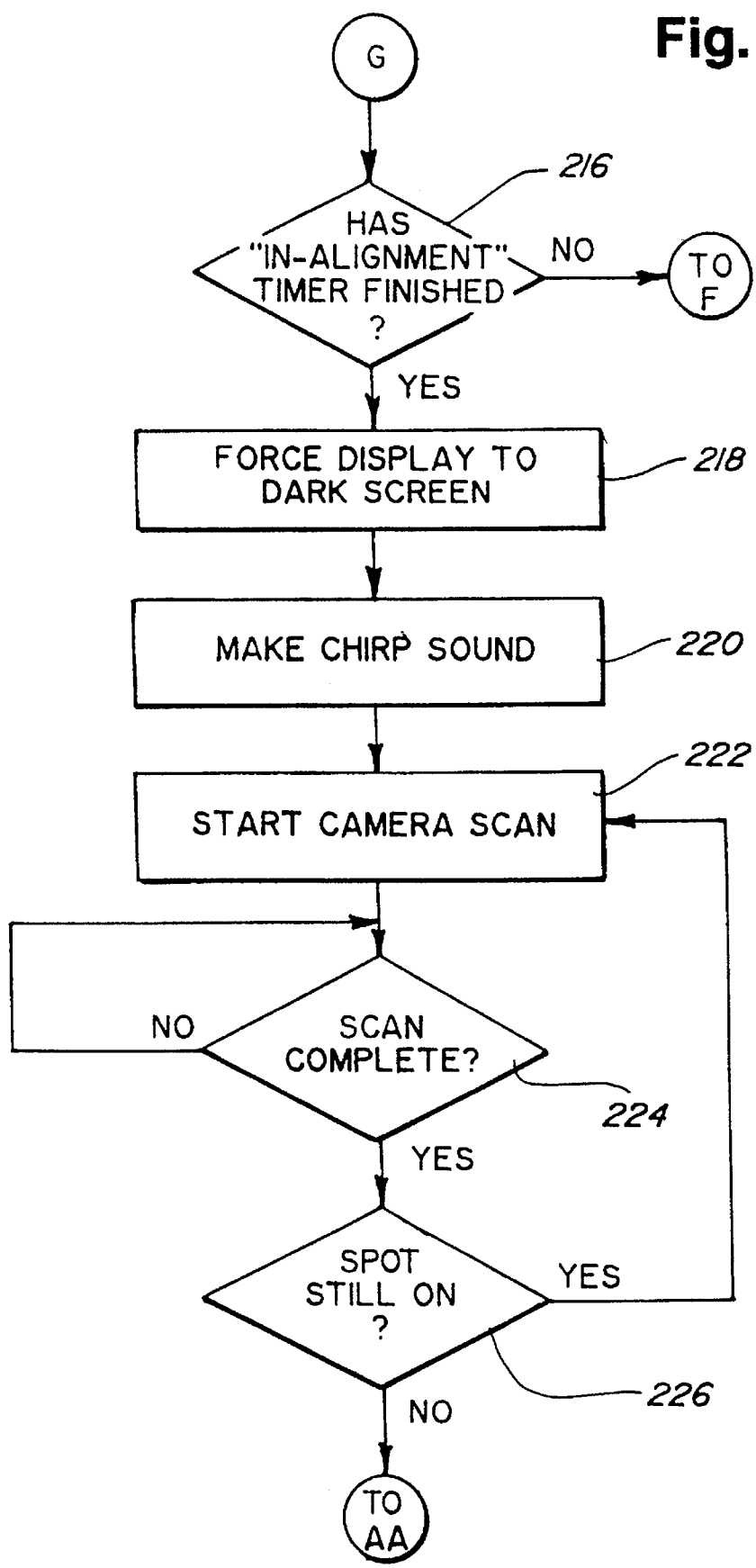
Figure 18:
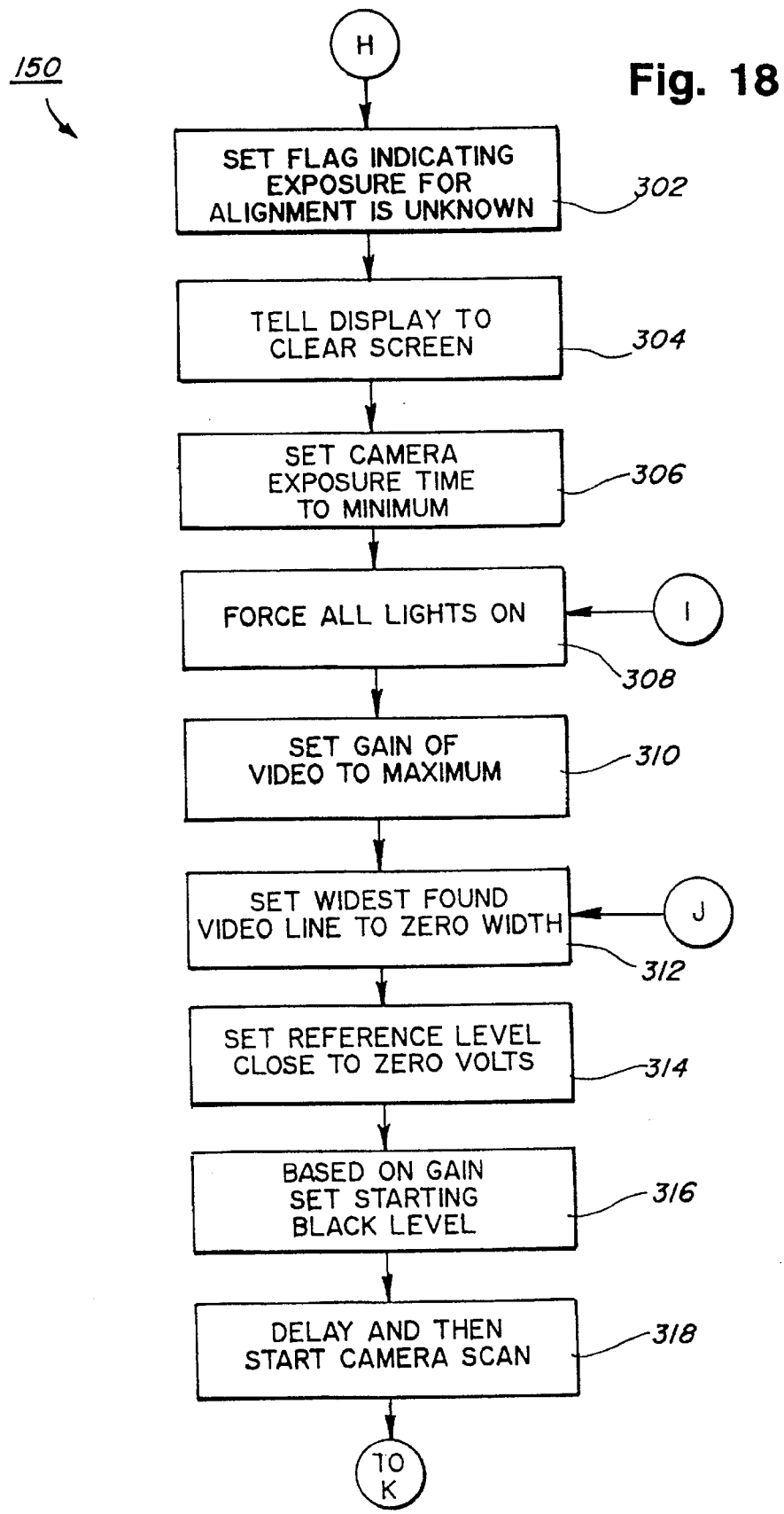
Figure 19:
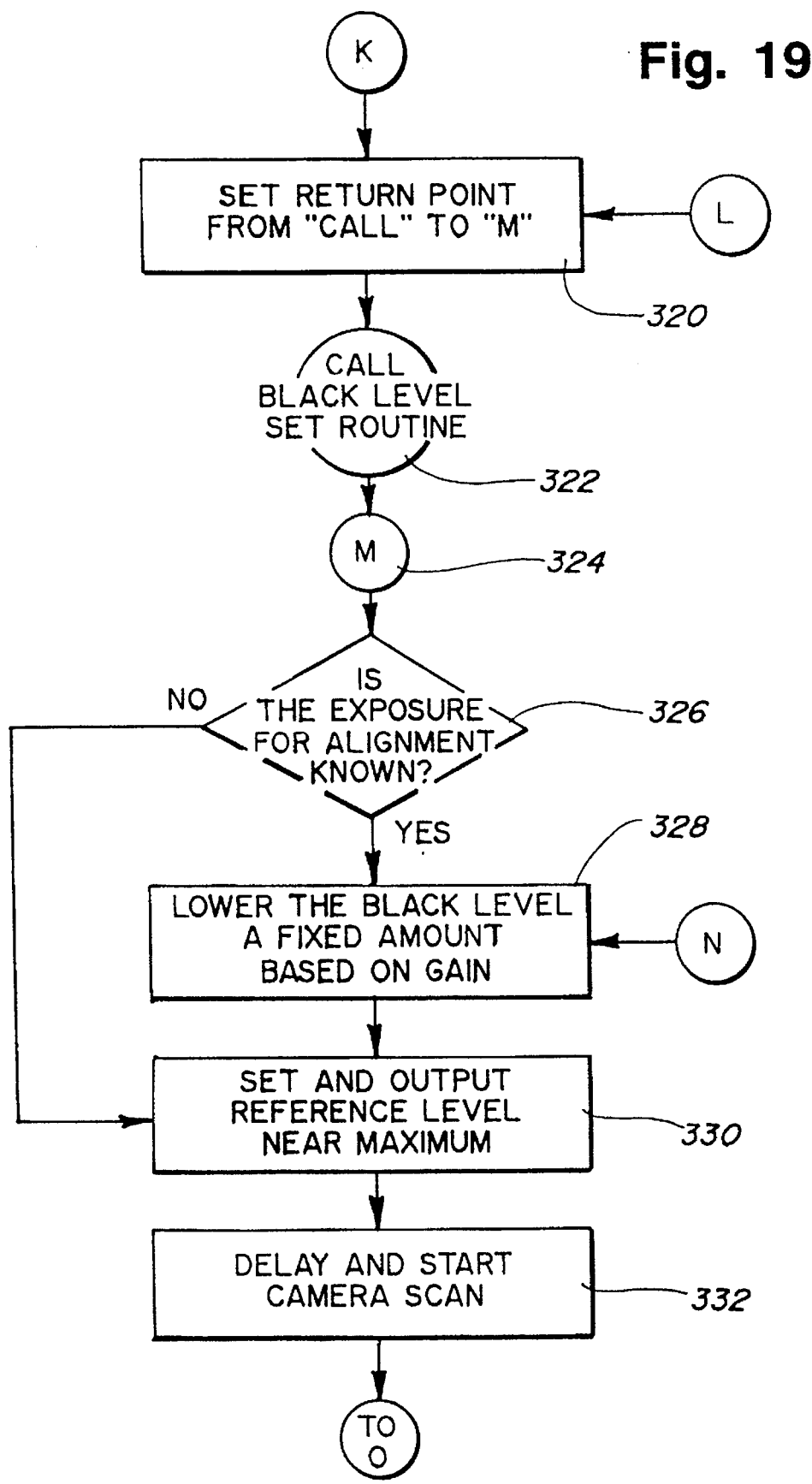
Figure 20:
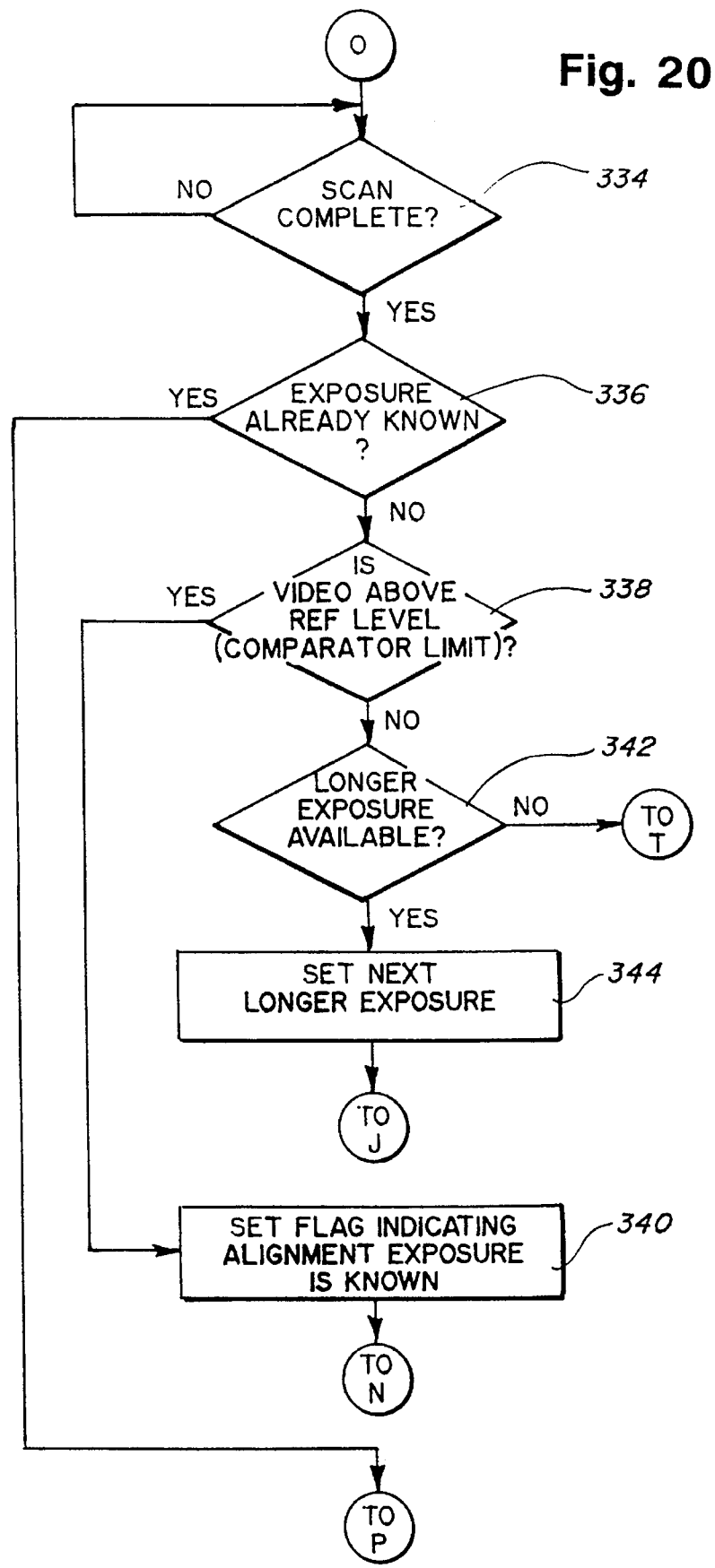
Figure 21:
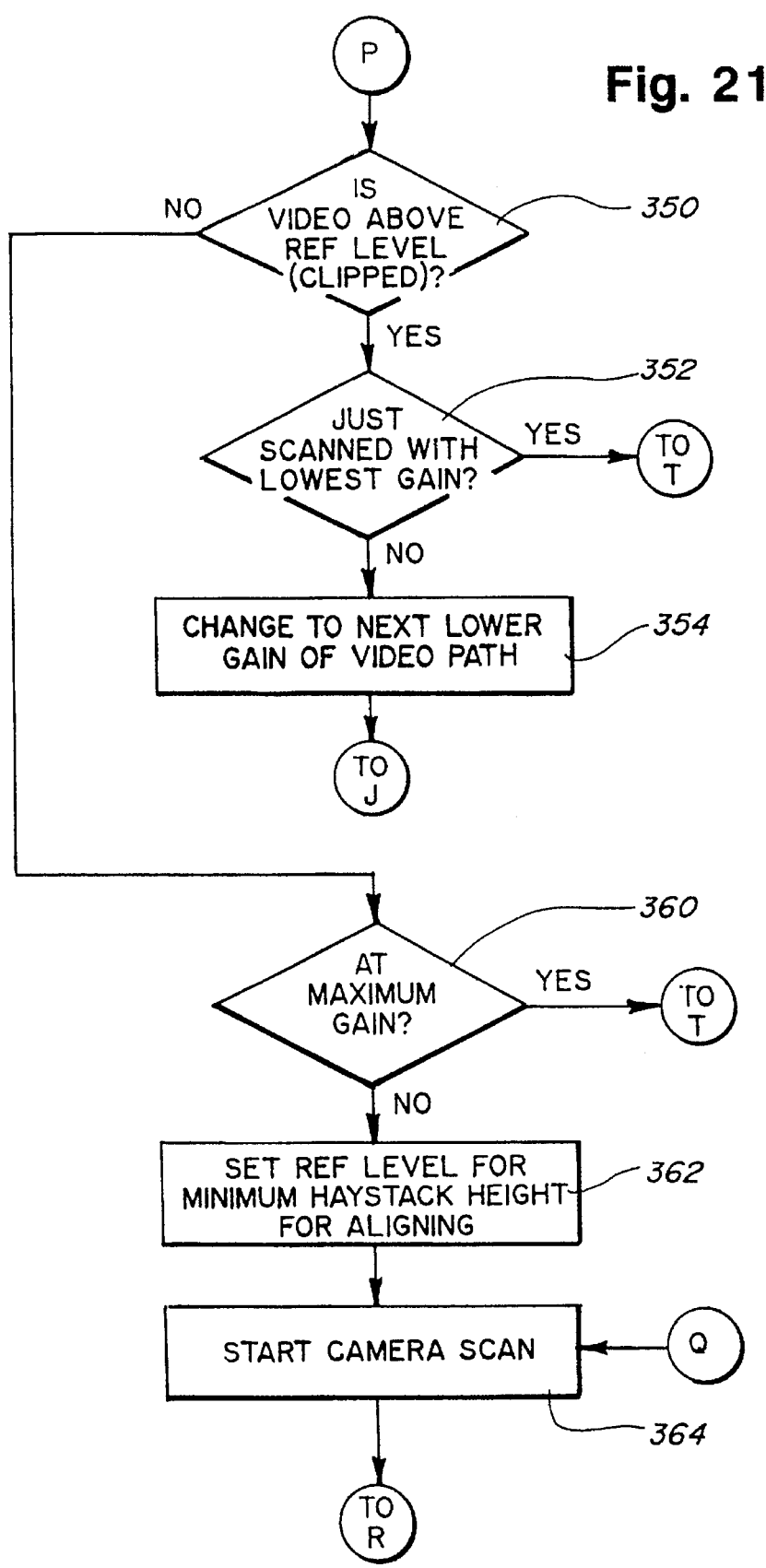
Figure 22:
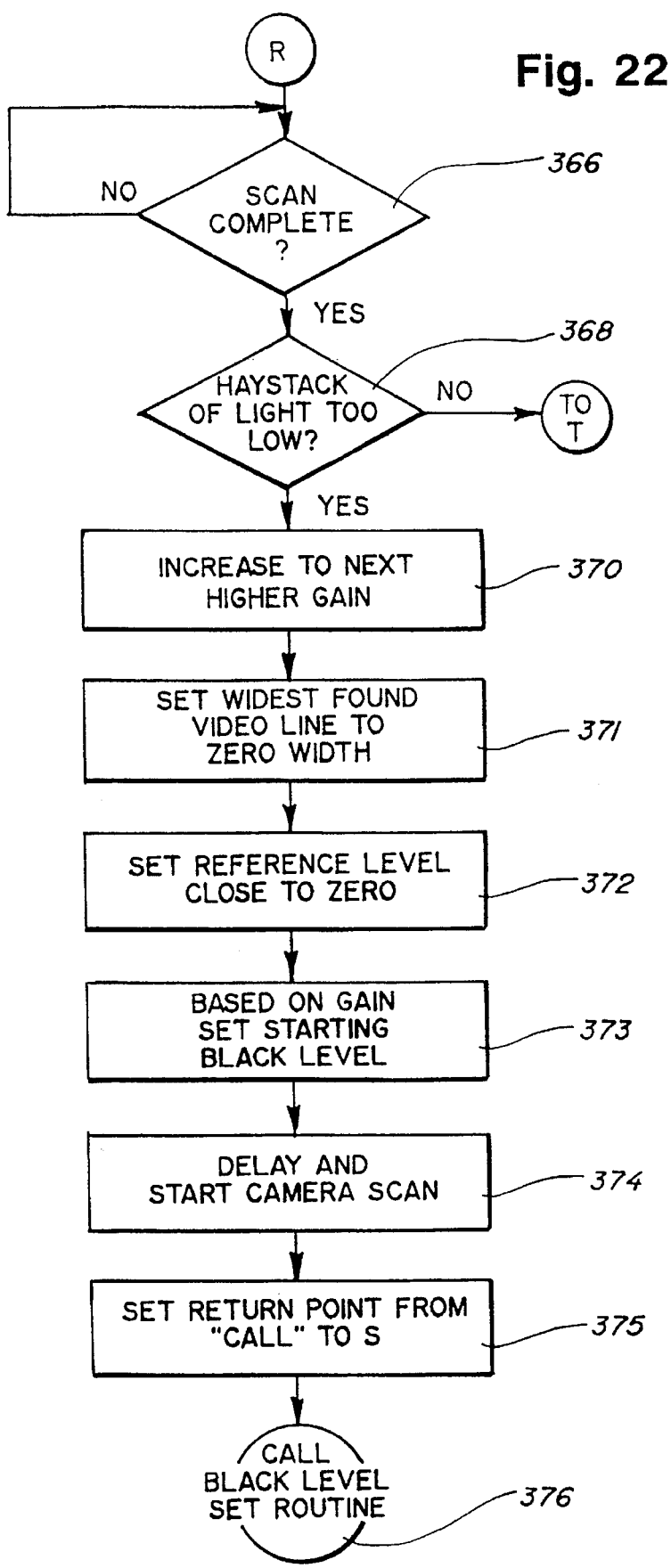
Figure 23:
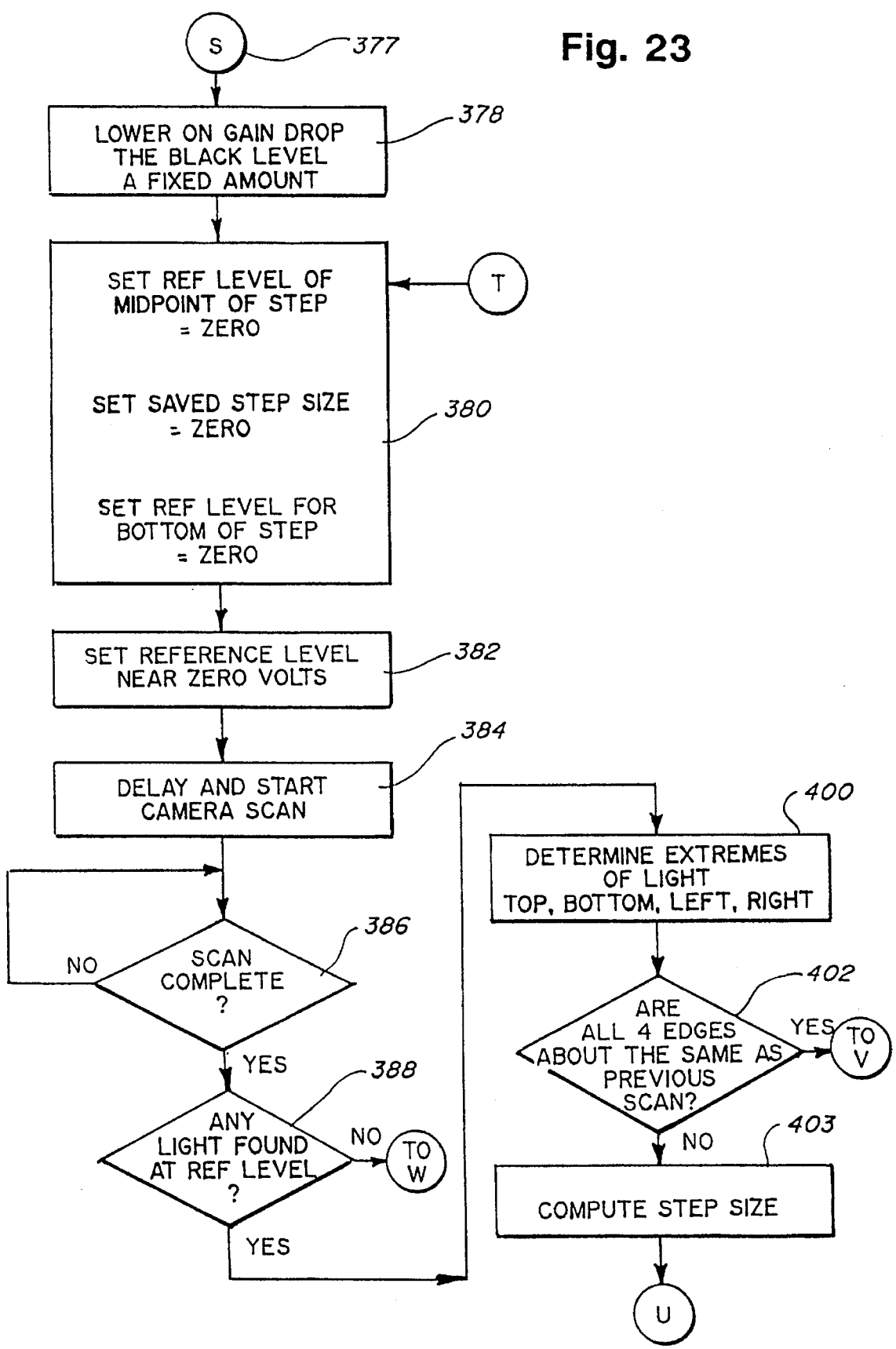
Figure 24:
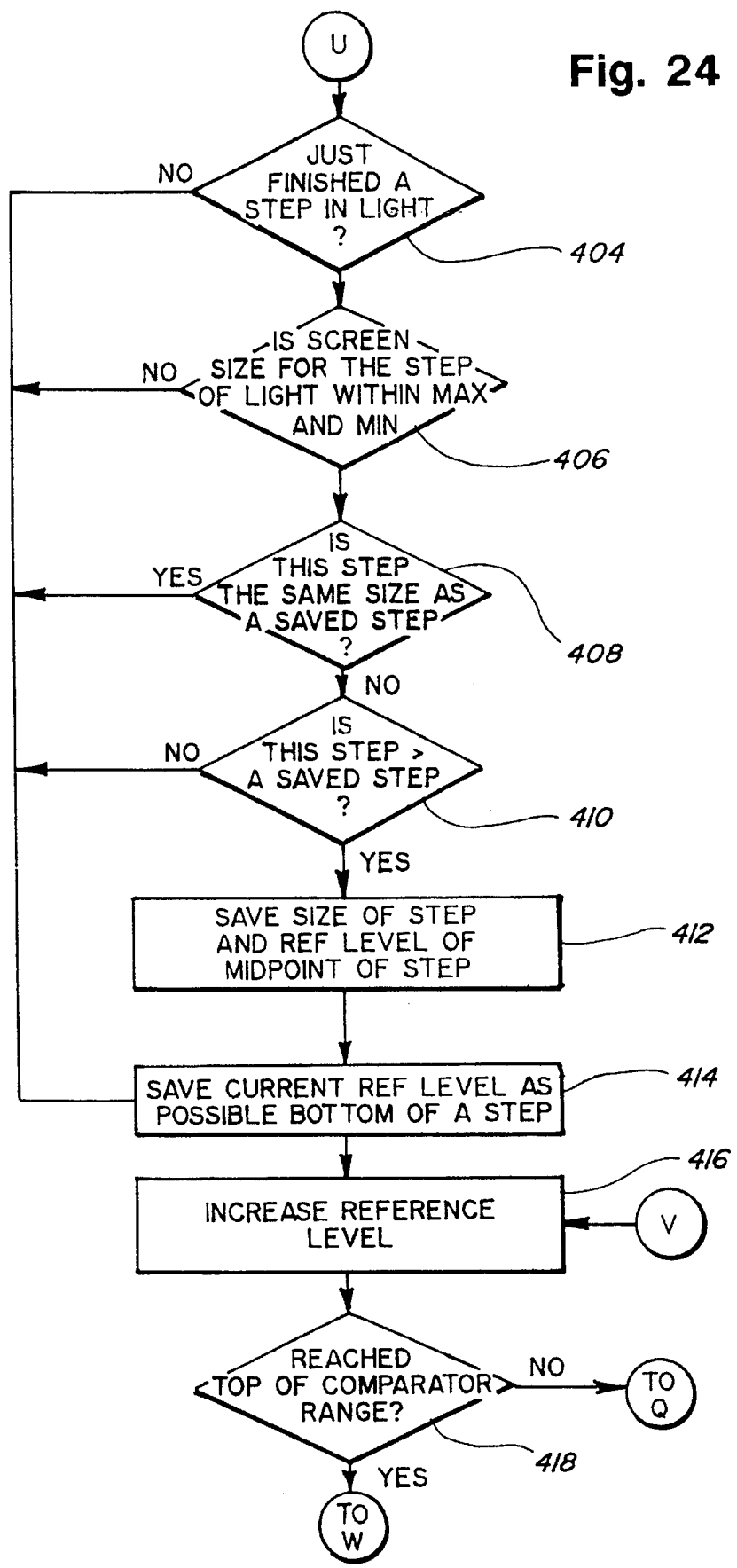
Figure 25:
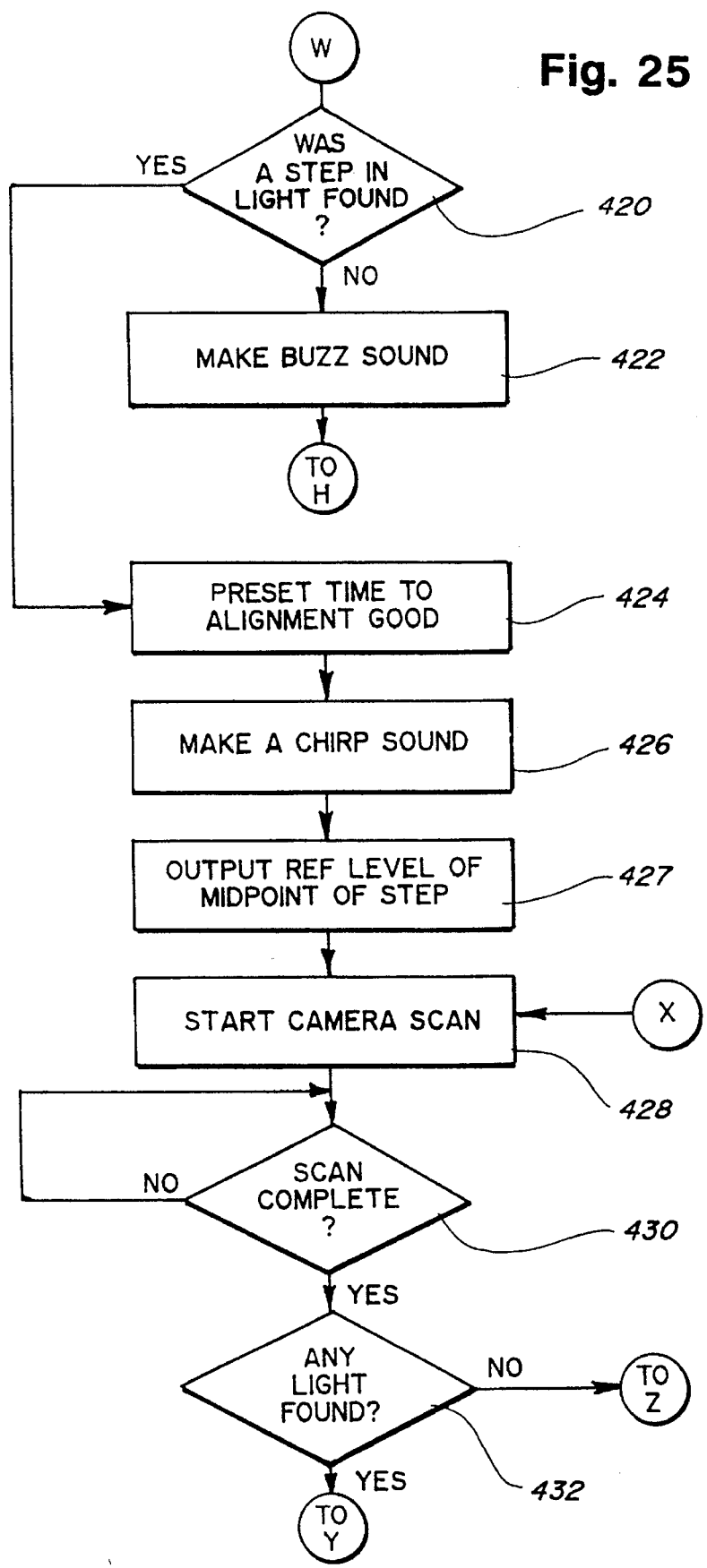
Figure 26:
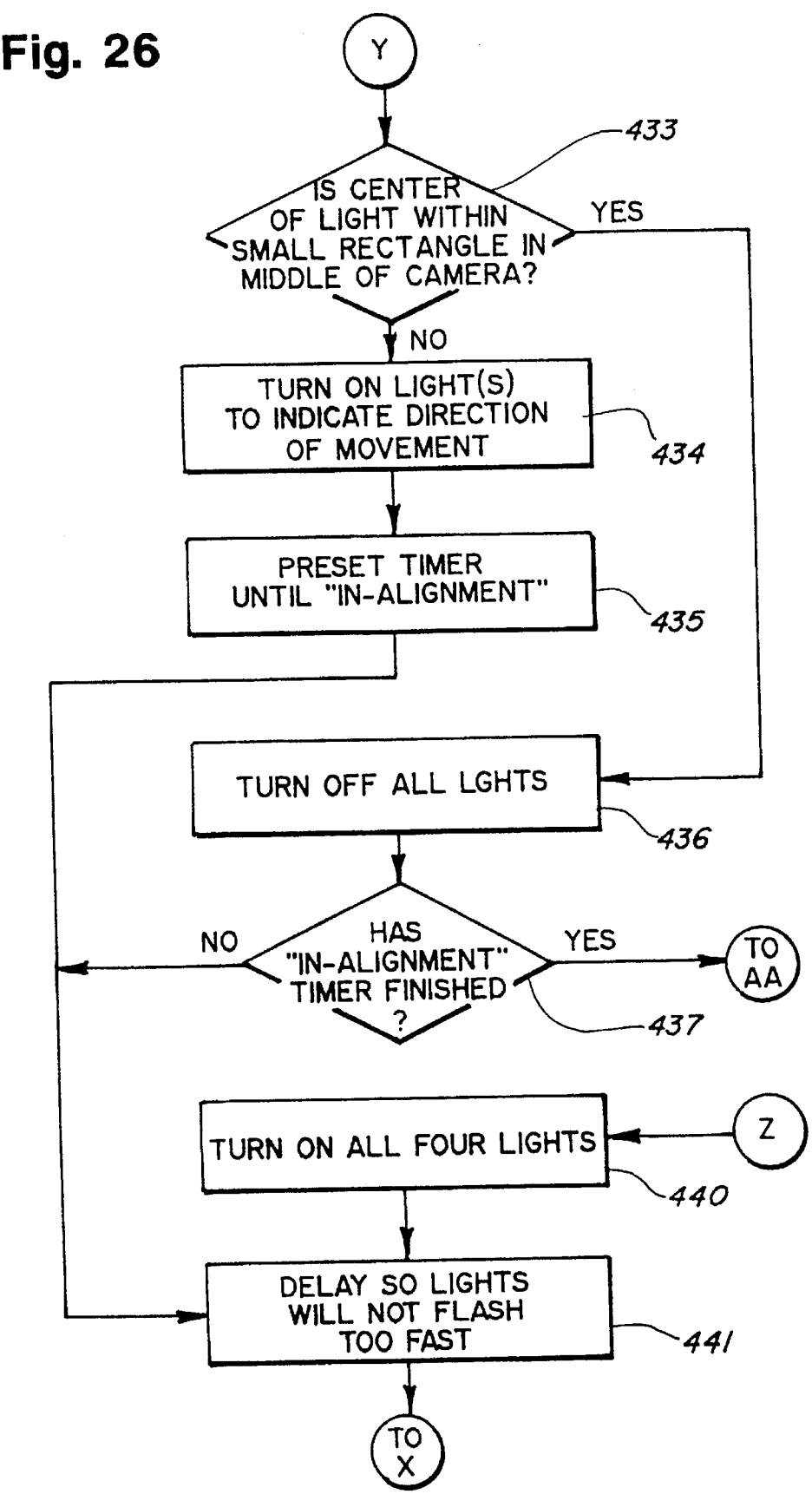
Figure 27:
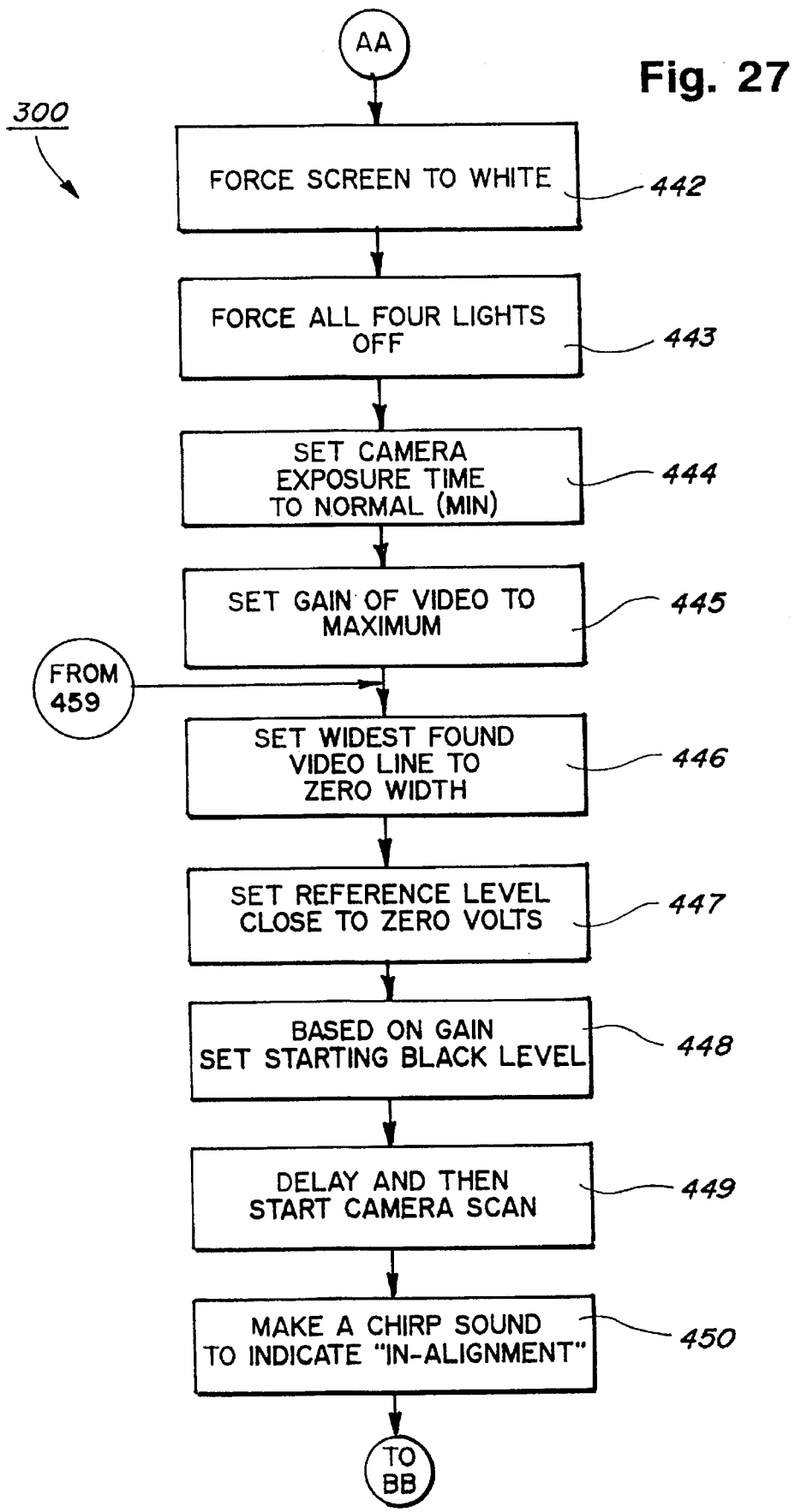
Figure 28:
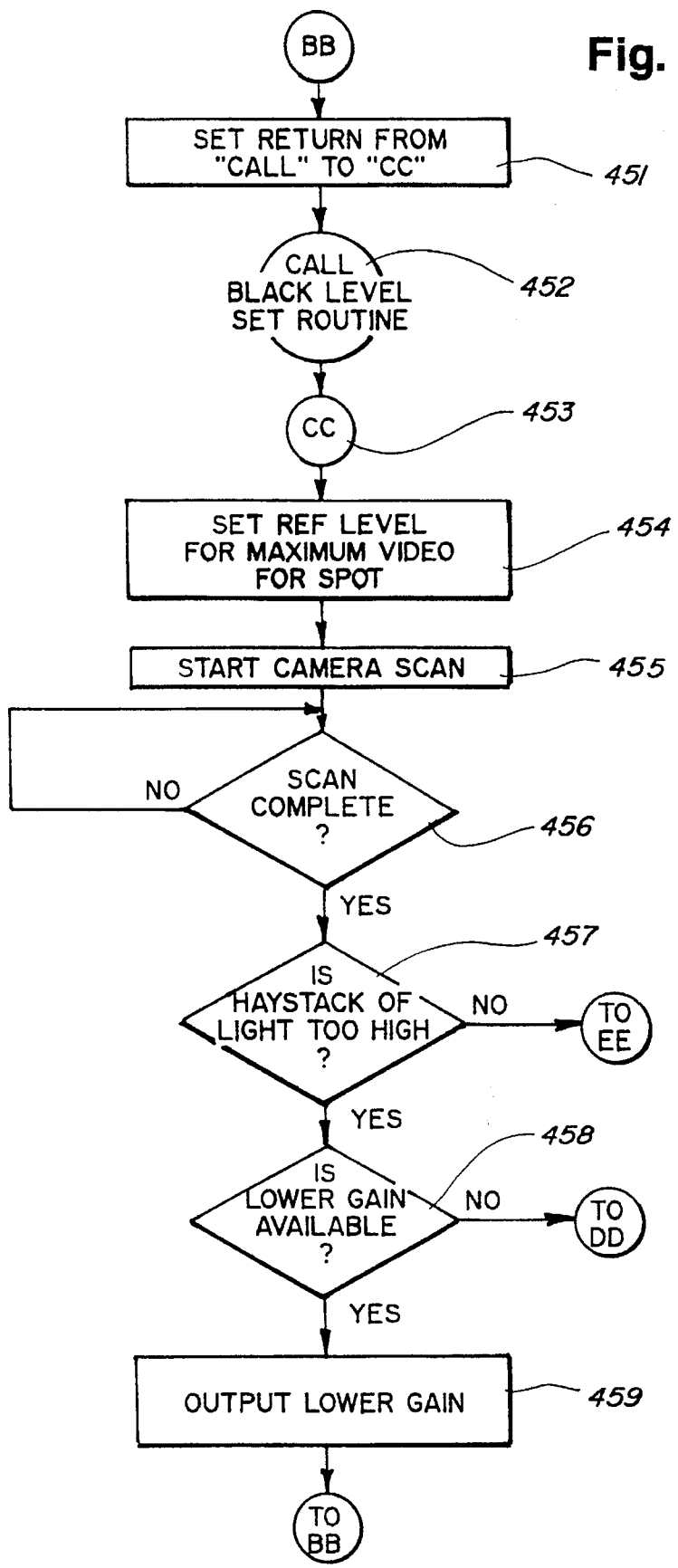
Figure 29:
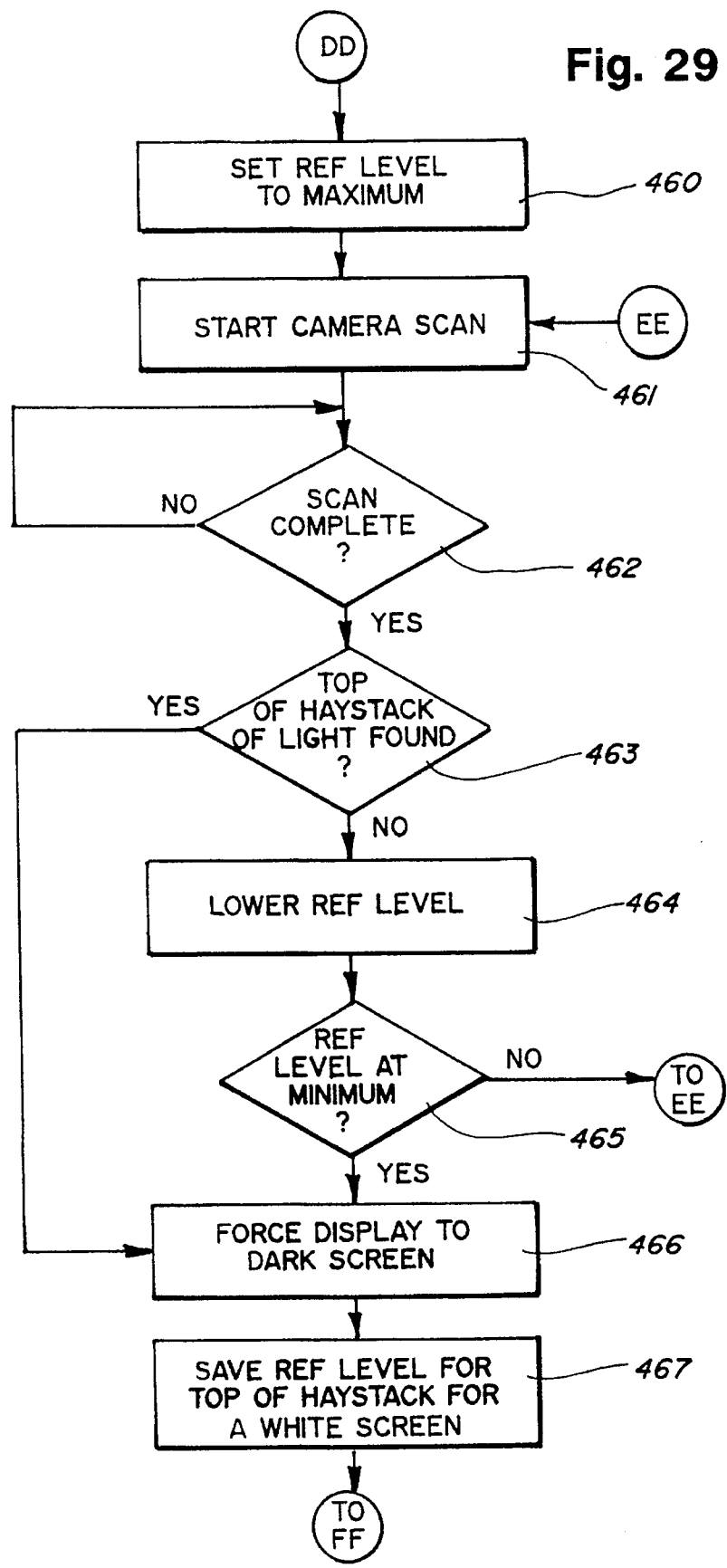
Figure 30:
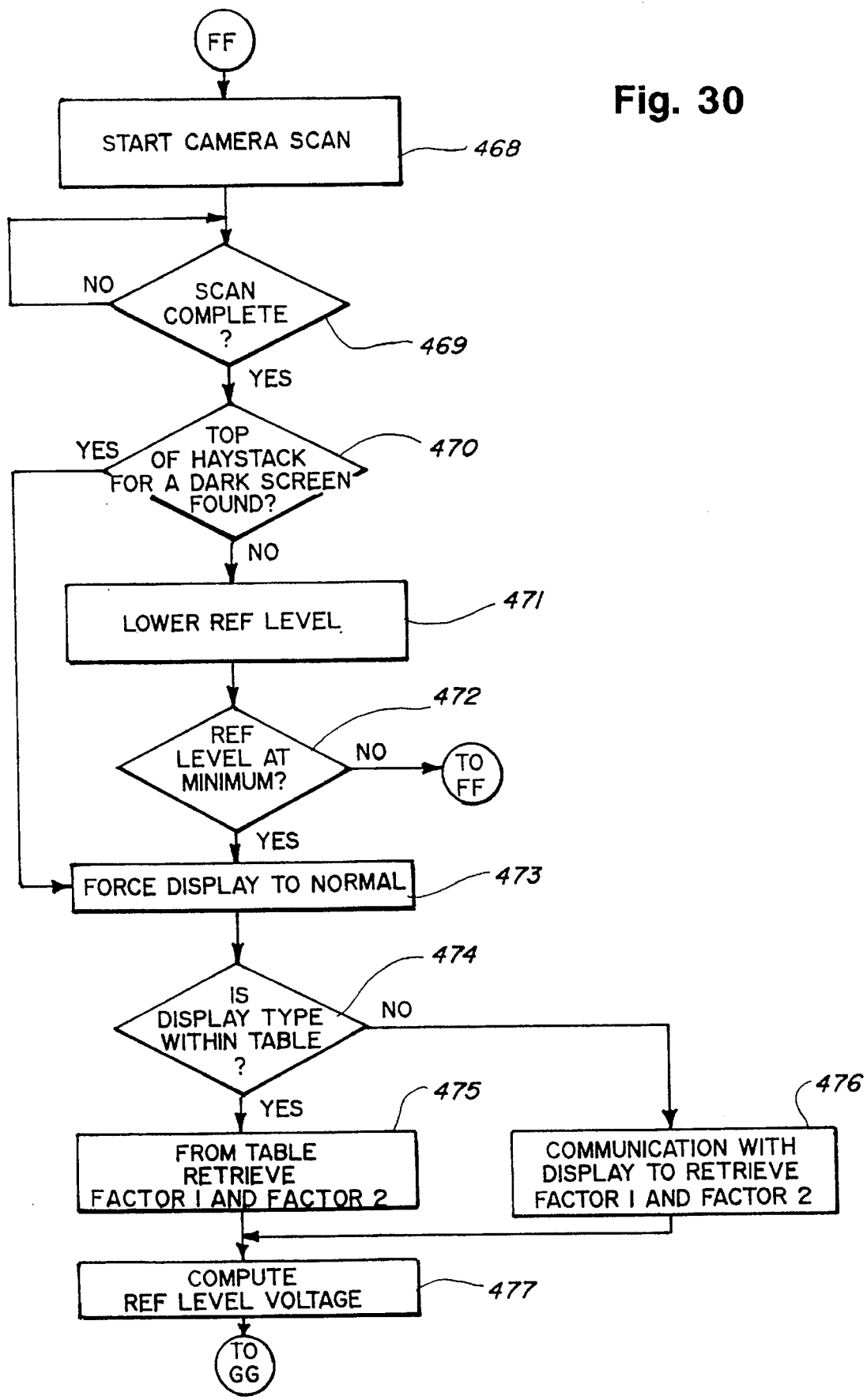
Figure 31:
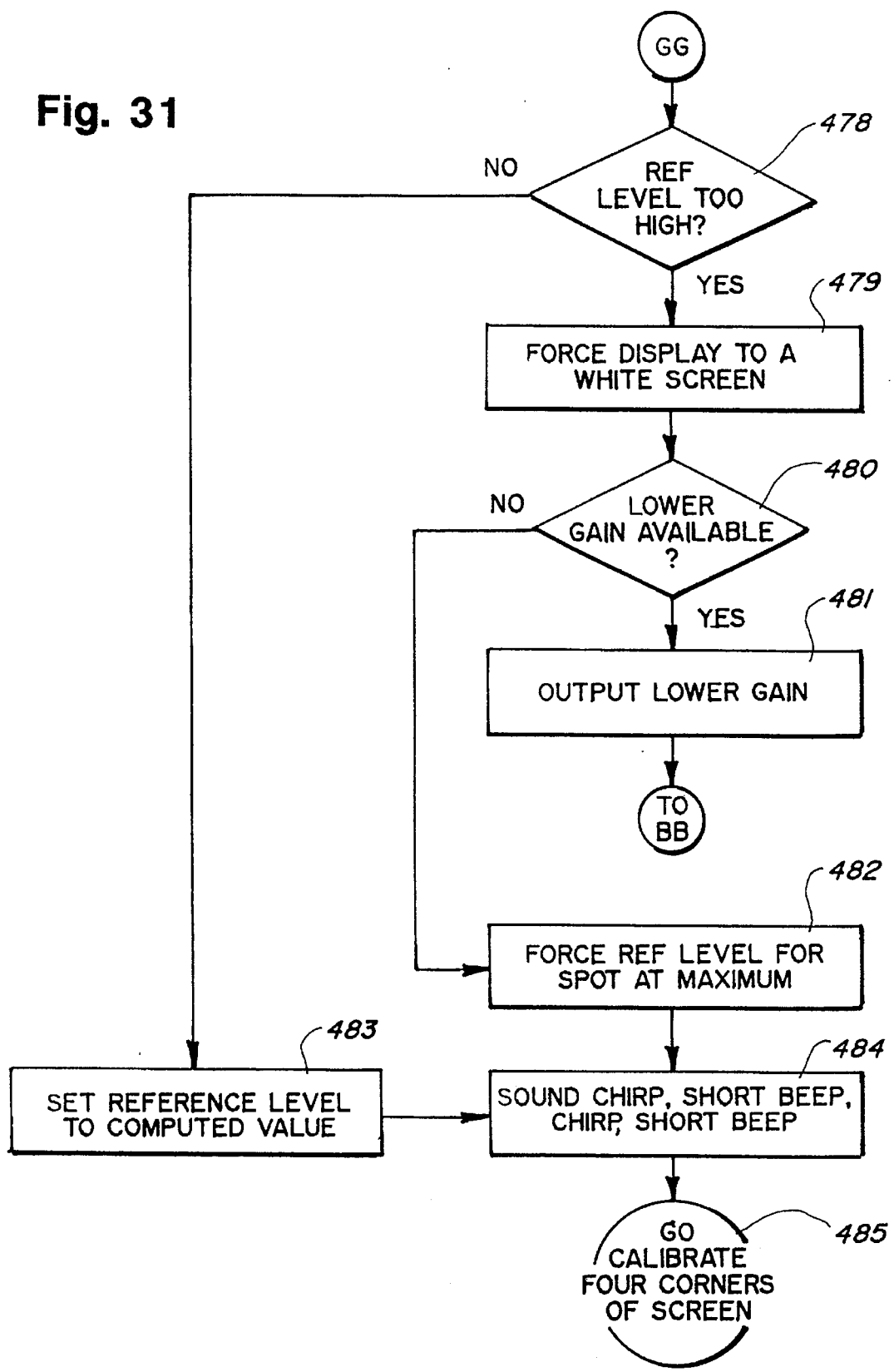

Considering now the alternative alignment subroutine 200 in greater detail with reference to FIGS. 16 to 17, the alternative alignment subroutine 200 commences at an instruction 202 which causes a scanning sequence to be initiated. The program then goes to a decision instruction 204 to wait for the scanning sequence to be completed.

When the scanning sequence is completed, the program advances to a decision instruction 206 to determine whether the auxiliary light image 27 has been detected. If the auxiliary light image 27 is not detected, the program goes to an instruction 208 that causes all of the light emitting diodes 70–73 to be illuminated. This particular configuration of illuminated diodes, informs the user 32 that the auxiliary light image was not detected. The program then returns to instruction 202 to start another scanning sequence.

It should be understood, the program will proceed through the above described program sequence 202, 204, 206, 208, 202, ... repeatedly until an auxiliary light image is detected, thus, providing the user 32 with notification that an error condition exists and corrective action is required.

Referring to the decision 206 again, if the auxiliary light image is detected, the program goes to a decision instruction 210 to determine whether the auxiliary light image 27 has been detected within the middle of the field of view 25 of the charge coupled device 34.

If the detected image is not within the middle of the field of view, the program goes to an instruction 212 that causes appropriate ones of the diodes 70–73 to be illuminated or turned off. The diodes 70–73 thus provide a visual indication to the user 32 of how to move the positioning device 44 to bring the detected auxiliary light image 27 into the center of the field of view of the device 34. In this regard, the calibration arrangement 9 desires the detected auxiliary light image 27 to be positioned in a small imaginary rectangle in the middle of the field of view of the device 34.

After providing the user 32 with a visual indication of how to position the charge coupled device 34, the program proceeds to an instruction 214 to preset an internal timer (not shown) in the microprocessor 42 to a predetermined elapse time. As will be explained hereinafter, device 44 must remain in alignment for a predetermined period of time.

Once the timer has been set, the program returns to the instruction 202 to initiate another scanning sequence. In this regard, the program proceeds as previously described until the user 32 properly aligns the device 34. When the light sensing device 34 is aligned, all of the light emitting diodes 70–73 turn off, thus providing the user 32 with a visual indication that center alignment has been completed.

When center alignment has been completed the program proceeds from the decision instruction 210 to a decision instruction 216 to determine whether the internal timer has completed its timing sequence. If the timer has not timed out, the program returns to the instruction 202 and repeats the sequence 202, 204, 206, 208, 216, 202 . . . until the timer has completed its timing sequence.

Once the timing sequence has been completed, the program proceeds from the decision instruction 216 to an instruction 218. Execution of instruction 218 causes the display unit 13 to override the computer generated image information and display a black image. The program then proceeds to an instruction 220 that causes the calibration arrangement 9 to generate a "chirp" sound to notify the user 32 that he or she should turn off the light generating device 26.

The program proceeds from the instruction 220 to an instruction 222, to start another scanning sequence. The program then advances to a decision instruction 224 to wait for the scanning sequence to be completed.

When the scanning sequence has been completed, the program proceeds from the decision instruction 224 to a decision instruction 226 to verify that the user 32 has deactivated the light generating device 26; i.e. the auxiliary light image 27 is no longer being detected. If the auxiliary light image 27 is still being detected, the program returns to instruction 222 to start another scanning sequence. From the foregoing, it will be understood the above described program sequence 222, 224, 226, 222 . . . will be repeated until the user 32 deactivates the light generating device 26.

Considering now the normal alignment subroutine 150 in greater detail with reference to FIGS. 18 to 26, the normal alignment subroutine 150 utilizes a bright clear white image displayed by unit 13 in order to facilitate the alignment of the device 34. More particularly, during the normal alignment process the calibration arrangement 9, seeks to identify a sharp change in the luminance level of the projected image and assume such a transition is one of a set of four edge portions defining the periphery boundaries of the projected image. The edge portions include a top edge portion 56, a bottom edge portion 57, a right side edge portion 58 and a left side edge portion 59.

In order to detect an edge portion, the charge coupled device 34 must generate a reflected light image signal 35 having a sufficiently large amplitude to permit detection of substantially different contrast levels defined by clear bright images and dark substantially noncolored images. In this regard, the program enables the microprocessor 42 1) to control the exposure time of the light sensing device 34 so that its output signal 35 has sufficient strength for contrast detection purposes; 2) to control the gain of the video path to the comparator 46, so the comparator 46 is able to distinguish the different contrasts; and 3) to control the voltage potential of a black level signal 43 in order to assure the voltage levels of the reflected light signal 35A are maintained within the voltage range of the comparator 46.

The normal alignment subroutine 150 commences at an instruction 302 to set up a proper exposure time for the device 34. In this regard, a flag is set indicating the exposure time is unknown. The program then advances to an instruction 304 that causes the microprocessor 42 to generate a signal that causes the display device 13 to override the computer generated video information and displays a bright substantially noncolored image.

After the bright image is generated, the program advances to an instruction 306, that causes the exposure time for the device 34 to be set to its minimum exposure time. From instruction 306, the program proceeds to an instruction 308.

When the program goes to the instruction 308, the microprocessor 42 causes all of the light emitting diodes 70–73 to be illuminated. The program then advances to an instruction 310 where the microprocessor 42 sets the gain of the amplifier arrangement 39 to maximum. The calibration arrangement 9, based on the foregoing, starts the alignment with the shortest exposure time and the maximum gain setting.

After the gain has been set to the maximum level, the program advances to an instruction 312 that causes the microprocessor 42 to set the internal line width register to zero. After the line width register is set to zero, the program proceeds to an instruction 314 which causes the reference level signal 48 to be set close to zero volts.

Once the reference level voltage has been established, the program advances to an instruction 316 which causes an initial or starting black level to be set relative to the present gain setting (which is set at its maximum level). Table I, as noted earlier, indicates the relationship between the gain settings and the starting black levels. Although there are a total of two hundred and fifty five level settings for the black level, a less than maximum black level setting of 186 is selected initially because the calibration procedure takes too long to complete if the maximum level of 255 is initially set.

The program then proceeds to an instruction 318 to start a scanning sequence after about a 60 millisecond delay that allows the circuits in the calibration arrangement 9 to settle. While the scanning sequence is commencing, the program advances to an instruction 320 that sets a returning address to a return location 324.

The program next executes a call instruction 322 to call the black level set routine 500 which causes the black level to be adjusted to near zero volts. When the black level set routine 500 is completed, the program returns to the previous set returning address, causing the program to return to return location 324.

The program then advances to a decision instruction 326 to determine whether the exposure time flag for the alignment procedure is known. It should be noted that one of the initial alignment steps at instruction 302 caused the exposure flag to be set to the unknown setting.

If the exposure time is unknown, the program goes to an instruction 330 which sets the voltage potential of the reference level signal 48 to near its maximum level of about 10 volts. If the exposure time is known, the program goes to an instruction 328 and drops the black level setting by a fixed amount based on the gain setting. Table II, as noted earlier, provided the relationship between the gain settings and the decrement values applied to the black level setting.

After the black level setting is decreased, the program proceeds to the instruction 330 and sets the reference level signal at near its maximum voltage of about 10 volts. From instruction 330 the program advances to an instruction 332 and starts another scanning sequence after about a 60 millisecond delay.

The program next executes a decision instruction 334 to determine whether the scanning sequence has been completed. If the sequence has not been completed, the program waits at the decision instruction 334. When the scanning sequence is completed the program goes to a decision instruction 336 to again determine whether the exposure time is known.

If the exposure time is unknown, the program proceeds to a decision instruction 338 to determine whether the reflected light image signal 35A is greater than the reference levels signal 48. In this regard, with the gain set to maximum, and the reference level signal 48 set to maximum, the comparator 46 will generate an output signal when the reflected light image signal 35A is greater than the reference level signal 48. The output signal from the comparator 46 is thus, indicative that at the present exposure time setting, a video image can be detected. The exposure time is therefore known and the program advances to an instruction 340 that causes an internal flag in the microprocessor 42 to be set to indicate that the exposure time is known.

As will be explained hereinafter, once the exposure time is sufficient to capture a given reflected light image signal 35, the black level signal 43 is decreased to adjust the voltage potential of the reflected light image signal 35 to optimize the signal 35A within the voltage range of the comparator 46. In this regard, the program proceeds from instruction 340 to the instruction 328 which causes the black level setting to be decreased by a predetermined fixed amount as shown in Table II. The program then proceeds from instruction 328 as previously described.

Referring again to the decision instruction 338, if the potential value of the reflected light image signal 35A is not greater than the potential value of the reference level signal 48, the program proceeds from instruction 338 to a decision instruction 342. A determination is made at decision instruction 342 whether a longer exposure time is available.

If a longer exposure time is not available, the program advances to an instruction 380 that will be described hereinafter. If a longer exposure time is available, the program goes to an instruction 344 that sets the exposure time to the next highest level. The program then returns to instruction 312, and proceeds as previously described but with a longer exposure time. In this regard, it should be understood that a longer exposure time will cause the voltage potential of the output signal from the light sensing device 34 to be increased.

The normal alignment subroutine 150 continues in the manner previously described from instruction 312 through instruction 344 repeatedly; however, through each sequence, the exposure time is increased until an output signal is generated. Such an output signal is indicative that the reflected image signal 35A is greater than the reference level signal 48.

If all of the exposure times have been attempted with the gain of the amplifier arrangement 39 set to a maximum without generating an output signal, the program will proceed to an instruction 380 that will be described hereinafter. In any event, the program determines whether any light can be found. If no light is found, the program will cause an audible alarm to be energized to notify the user 32 that corrective action must be taken.

Referring again to the decision instruction 336, if the exposure time is known, the program advances to a decision instruction 350 to determine whether the reflected light image signal 35A is greater than the reference level signal 48. In this regard, if the comparator 46 generates an output signal, the reflected light image signal 35A is greater than the reference level signal 48. The program in response to a "clipped video signal" determination, advances to a decision instruction 352 to determine whether the last completed scanning sequence was executed with the gain of the amplifier arrangement 39 sets at its lowest level.

If the gain was not set to the lowest level, the program advances to an instruction 354 which causes the microprocessor 42 to generate a select gain signal forcing the next lower gain level to be selected. The program then returns to the instruction 312, and proceeds as previously described.

If the image just scanned was observed by the light sensing device 34, with the gain set at its lowest level, the program goes to the instruction 380. From the foregoing, it should be understood that with a known shortest exposure time, the calibration arrangement 9 will cause the gain setting of the amplifier arrangement 39 to be decreased repeatedly until the reflected image signal 35A is less than the maximum setting for the reference level signal 48.

Referring again to the decision instruction 350, if the comparator 46 fails to generate an output signal, the reflected light image signal 35A is less than the reference level signal 48. Responsive to such a determination, the program proceeds to a decision instruction 360 to determine whether the gain is set at its maximum level. If the gain is set at a maximum level, the program proceeds to the instruction 380.

If the gain is not set at a maximum level, the program next executes an instruction 362 which sets the reference level signal 48 to a predetermined voltage of about 6 volts. This is the smallest acceptable reference level voltage setting (for all gain level setting) for alignment purposes. Stated otherwise, for the purpose of alignment the reflected light image signal 35A must always be substantially greater than 6 volts.

The program next proceeds to an instruction 364 which causes another scanning sequence to be commenced. After the next scanning sequence has been commenced, the program executes a decision instruction 366 to wait for the scanning sequence to be completed.

When the scanning sequence has been completed, the program executes a decision instruction 368 to determine whether the reflected light image signal 35A is greater than the reference level signal 48. If the reflected light image signal 35A is not too small, the program advances to the instruction 380. If the reflected light image signal 35A is too small, the program advances to an instruction 370 which causes the next higher gain level to be selected.

After the next highest gain level is set, the program advances to an instruction 371 which causes the video line width register to be reset to zero. The program then executes an instruction 372 which causes the reference level signal 48 to be set at about zero volts.

The program next executes an instruction 373 which sets a starting black level based on the gain setting as set forth in Table I. Once the voltage potential of the starting black level signal 43 has been set, the program goes to an instruction 374 which causes another scanning sequence to be commenced. The program next executes an instruction 375 which sets a returning address for the program to a return location 377. After setting the return location, the program advances to a call instruction 376 which causes the black level set subroutine 500 to be called. From the foregoing, it should be understood that the program causes another black level adjustment before commencing to search for a step change in the reflected light image 35A.

After the black level set subroutine 500 has been executed, the program returns to the instruction 377. The program then proceeds to an instruction 378 which causes the black level to be decreased based on the current gain setting as set forth in Table II.

The program then continues to the instruction 380 which initializes a set of internal registers (not shown) denoted as a midpoint of step register, a step size register, and a bottom of step register. As will be explained hereinafter in greater detail, these registers will be loaded with data that will be indicative of a step change in the luminance level of the reflected light image.

The program next executes an instruction 382 which causes the reference level signal 48 to be set near zero volts. The program then proceeds to an instruction 384 to cause another scanning sequence to be commenced.

The program proceeds to a decision instruction 386 to wait for the scanning sequence to be completed. When the scanning sequence is completed, the program advanced to a decision instruction 388 to determine whether any light was found at the existing reference level signal setting; i.e. if an output signal was generated by the comparator 46, the output signal would be indicative that the reflected light image signal 35A was greater than the present reference level signal 48.

If light is not detected at the existing reference level voltage, the program goes to a decision instruction 420 that will be described hereinafter in greater detail. If light is detected, at the existing reference level voltage, the program proceeds to an instruction 400 which determines the maximum and minimum values stored in the horizontal and vertical counters 89 and 90 respectively. The maximum and minimum values are indicative of the top, bottom, left and right locations of the luminance level steps produced from the clear image generated by device 13.

The program next executes a decision instruction 402, to determine whether the stored values are about the same as determined during the previous scan. As these values have not been previously stored, they will not be at about the same values.

Responsive to a determination that the present values are about the same as the previously stored values, the program goes to an instruction 416 as will be described hereinafter.

If the values are not about the same, the program proceeds to an instruction 403 that causes the step size to be computed based on the following formula:

$$\text{Step Size} = \begin{array}{l}\text{Voltage Potential of} \\ \text{Current Reference} \\ \text{Level Signal}\end{array} - \begin{array}{l}\text{Voltage Potential of} \\ \text{Reference Level Signal} \\ \text{for Saved Bottom of Step}\end{array}$$

After computing the step size, the program proceeds to a decision instruction 404 which determines whether a step of light has been detected. It should be noted that a step of light is defined as all four edges of the projected light image being at about the same value plus or minus a given constant and the step size is greater than or equal to V, where V is 314 millivolts.

If a step of light has not been detected, the program goes to an instruction 414 which causes a digital value indication of the voltage potential of the current reference level signal 48 to be saved.

After saving the current reference level, the program advances to the instruction 416 which causes the reference level voltage to be increased by a predetermined amount of about 78 millivolts. It should be understood that the saved reference level voltage could be indicative of the luminance level transition at the edge of the projected image; i.e. the bottom of a step of light.

Referring to the decision instruction 404, if a step of light has been detected, the program proceeds to a decision instruction 406 to determine whether the projected image size for the present step of light is within a set of predetermined maximum and minimum levels. Stated otherwise, the microprocessor 42 determines whether the top, bottom, left and right values are within the predetermined maximum and minimum levels. In this regard, the extreme values stored in the horizontal and vertical counters 89 and 90 respectively are compared with the following maximum and minimum value:

|         | Horizontal | Vertical |
|---------|------------|----------|
| Maximum | 133        | 188      |
| Minimum | 42         | 60       |

If the size is not within the maximum, minimum values, the program goes to the instruction 414, which causes a digital value indicative of the potential of the current reference level signal 48 to be saved as previously described. If the size is within the maximum and minimum values, the program goes to a decision instruction 408 to determine whether the present step has a value that is about the value of a previously stored step (instruction 380 initially set at the step size value to zero).

If the step has about the same size, the program goes to the instruction 414 and proceeds as previously described. If the step is not about the same size, the program advances to a decision instruction 410 to determine whether the size of the present step is greater than the previously stored step size (again, instruction 380 initially set the step size value to zero).

If the step size is not greater than the previously saved step size, the program goes to the instruction 414 and proceeds as previously described. If the step size is greater than the previously stored step size, the program next executes an instruction 412, which causes a digital value indicative of the size of the step and a digital value indicative of the potential value of the reference level signal 48 at the midpoint of the step to be saved.

Next the program proceeds to the instruction 414 which causes a digital value indicative of the potential of the current reference level signal 48 to be stored as a possible value for the bottom of a step.

After executing instruction 414 the program advances to the instruction 416 which causes the voltage potential of the reference level signal 48 to be increased by a predetermined amount. After the reference level signal has been increased, the program goes to a decision instruction 418 to determine whether the potential value of the present reference level signal 48 is equal to about 10 volts or the maximum acceptable reference voltage potential for the comparator 46.

If the reference level signal 48 is not set to the top range of the comparator 46, the program returns to instruction 364 causing another scanning sequence. The program proceeds from instruction 364 as previously described.

If the reference level signal 48 is set to the top range of the comparator 46, the program advances to the decision instruction 420. Decision instruction 420 determines whether a step in luminance levels was found. If no step was found, the program advances to an instruction 422 which causes the calibration arrangement 9 to make a "buzz" sound notifying the user 32 that alignment was not possible.

After the alarm is sounded, the program returns to instruction 302 in order to attempt another alignment. In this regard, when the buzz alarm is sounded, the user 32 must take some form of corrective action such as to darken the ambient lighting condition in the room, or to move the overhead projector 20 closer to the viewing surface 22.

If a step of light was found at decision instruction 420, the program next executes the instruction 424 which causes a timer to be set for continued alignment.

After the timer is set, the program advances to an instruction 426 which causes an audible "chirp" sound to be produced notifying the user 32 that a step was found and camera alignment will now proceed.

The program next executes an instruction 427, that causes the voltage potential of the reference level signal 48 to be set to the mid point value previously stored relative to the detected step in light. The program then goes to an instruction 428, that causes another scanning sequence to be commenced. The program then proceeds to a decision instruction 430 to wait for the scanning sequence to be completed.

When the scanning sequence is completed, the program advances to a decision instruction 432 to determine whether any light is found. If no light is found, the program proceeds to an instruction 440, that causes all of the light emitting diodes 70–73 to be illuminated. If light is found, the program advances to a decision instruction 433.

At decision instruction 433, a determination is made whether the center of the computer generated reflected light image 24 is within a small imaginary rectangular area of the field of view of the light sensing device 34. If the image is centered, program goes to an instruction 436 which causes all of the light emitting diodes 70–73 to be turned off. This provides a visual indication to the user 32 that the device 34 has been properly aligned. If the image is not centered, the program goes to an instruction 434 that causes appropriate ones of the light emitting diodes 70–73 to be energized for instructing the user 32 how to move the positioning device 44 in a predetermined manner; i.e. up, down, left, right or combinations thereof. The program next executes an instruction 435 which set an alignment timeout timer (not shown).

After the alignment timeout timer has been set, the program advances to an instruction 441 which causes the program to delay for a predetermined period of time. The program then returns to instruction 428 and proceeds as previously described.

From the foregoing, it should be understood that the instruction loop from instruction 428 through 441 enables the user 32 to position the device 44 so the projected image is aligned with an imaginary rectangular square in the field view of the light sensing device 34.

Referring to instruction 436, after all of the light emitted diodes 70–73 have been turned off, the program goes to a decision instruction 438 to determine whether the alignment timeout timer has completed its sequence. If the timer has not completed its sequence, the program goes to the instruction 441 and proceeds as previously described. If the timer has completed its sequence, the program advances to an instruction 442 which causes the image on the display unit 13 to be a bright clear image.

Considering now the sensitivity subroutine 300 in greater detail with reference to FIGS. 27 to 31, the sensitivity subroutine 300 commences at an instruction 443, that causes all of the light emitting diodes 70–73 to be turned off. The program then advances to an instruction 444, that sets the exposure time of the device 34 to a minimum level. A minimum exposure time is required for sensitivity alignment to assure reliable spot detection and tracking operations.

From instruction 444, the program executes an instruction 445 which sets the gain level to its maximum level. After the gain level has been set to maximum, the program goes to an instruction 446, that causes the line width register to be reset to zero.

Next an instruction 447 is executed that causes the reference level signal 48 to be set near zero volts. After the voltage potential of the reference level signal 48 is set, the program goes to an instruction 448 that sets the starting black level based on the gain setting in accordance with Table I. The program then advances to an instruction 449, that starts another scanning sequence after about a 60 millisecond delay to allow the calibration arrangement circuits to settle.

When the scanning sequence is commenced, the program advances from instruction 449 to instruction 450 which causes the apparatus 9 to produce an audible "chirp" sound to indicate the optical auxiliary input system 10 is in alignment.

The program next executes a return location instruction 451 that sets a return address to a return location 453. The program proceeds from an instruction 451 to a call instruction 452 which calls the black level set subroutine 500.

After the black level set subroutine 500 has been executed, the program returns to the return location 453 and proceeds from thence to an instruction 454. Instruction 454 sets the voltage potential of the reference level signal 48 to about 4.0 volts for detecting a reflected light image signal 35A having auxiliary light information. Setting the reference level signal 48 to this predetermined potential level is necessary to adjust the gain for a particular desired signal level.

After setting the reference level signal 48 to the desired potential, the program proceeds to an instruction 455 which commences another scanning sequence. The program then proceeds to a decision instruction 456 to wait for the scanning sequence to be completed.

When the scanning sequence is completed, the program proceeds to a decision instruction 457 to determine whether the selected gain level is too large. In this regard, an excessively large gain setting would preclude detecting that portion of the reflected light information signal 35 that is indicative of the auxiliary light information. It should be noted that the determination is based upon the difference between the maximum and minimum values stored in the horizontal counter exceeding a prestored constant.

If the gain is too large, the program goes to a decision instruction 458 to determine whether a lower gain setting is available. If a lower gain setting is available, the program then advances to an instruction 459, that causes the next lower gain to be selected. After selecting the lower gain level, the program returns to instruction 451 and proceeds as previously described.

If the gain is not too large as determined at instruction 457, the program goes to an instruction 461 that will be described hereinafter.

Referring again to the decision instruction 458, if a lower gain is not available, the program proceeds to an instruction 460, that causes the reference level signal 48 to be set to a maximum value. The program then goes to the instruction 461, that causes another scanning sequence.

The program next executes a decision instruction 462, to determine when the scanning sequence has been completed. When the scanning sequence has been completed, the program goes to a decision instruction 463 to determine whether the maximum level of the reflected light image signal 35A has been found. If the top of the reflected light image signal 35A has been found, the program proceeds to an instruction 466, as will be described hereinafter. If the top of the reflected light image has not been found, the program proceeds to an instruction 464 which reduces the potential value of the reference level signal 48 by a predetermined amount.

The program then advances to a decision instruction 465 to determine whether the potential of the reference level signal 48 has been set to a minimum value. If the signal 48 has not been set to a minimum value, the program returns to the instruction 461, starting another scanning sequence, and proceeds as previously described. If the reference level signal 48 has been set to a minimum value, the program proceeds to the instruction 466.

At instruction 466, the microprocessor 42 generates a signal that causes the image displayed by the display unit 13 to a dark level. The program then advances to an instruction 467 which saves a digital value indicative of the voltage potential of the present reference level signal 48 as a possible maximum potential value for the reflected light image signal 35A while the display 13 is generating a bright clear image.

The program next executes an instruction 468 which causes another scanning sequence to be started. The program then advances to a decision instruction 469 and waits for the scanning sequence to be completed.

When the scanning sequence is completed, the program advances to a decision instruction 470 to determine whether a maximum level of the reflected image signal 35A has been determined for the dark reflected image.

If the maximum level of the reflected image signal 35A is not established, the program proceeds to an instruction 471, that causes the potential of the reference level signal 48 to be decreased by a predetermined amount. The program next determines, at a decision instruction 472, whether the potential of the reference level signal 48 is at a minimum level.

If the potential of the reference level signal 48 is not at a minimum level, the program returns to instruction 468 to commence another scanning sequence for detecting the maximum level of the reflected image signal 35A. If the reference level signal 48 is at a minimum potential, the program advances to an instruction 473 which allows the display unit 13 to display the normal computer generated image 24 in lieu of the dark image.

Referring again to decision instruction 470, if a maximum vertical count is found for the dark image, the program goes to the instruction 473 and proceeds as previously described; i.e. the display unit 13 is permitted to display the normal computer generated image 24 instead of the dark image.

The program proceeds from instruction 473, to a decision instruction 474, to determine whether the display unit 13 is a given type of model. If the unit 13 is a known model, the program proceeds to an instruction 475 which causes a pair of optical correction factors to be retrieved from a look-up table. If the unit 13 is not a known model, the program proceeds to an instruction 476 which causes the calibration arrangement 9 to communicate with the display unit 13 for the purpose of receiving the correction factors indicative of its display characteristics. Table III illustrates the optical correction factors for three types of liquid crystal display units sold and manufactured by Proxima Corporation of San Diego, Calif.

TABLE III

| Model of Liquid<br>Crystal Display Units | Factor 1<br>(Constant) | Factor 2<br>(Volts) |
|---|---|---|
| A482 | 1.0 | 0.8 |
| A722 | 3.2 | 1.0 |
| A822 | 2.57 | 1.0 |
| A822 rear projection | 6.0 | 2.5 |

It should be noted as mentioned earlier, that there is a given relationship between various reflected light image signals 35 indicative of bright clear images, dark images and those portions of the corresponding reflected light image signal 35 which are indicative of auxiliary light information produced from an incandescent light source, a low intensity laser light source, and a high intensity laser light source. The relationship also extends to the projection direction of the reflected light image; i.e. front projection or rear projection. In this regard, the following formula has been determined experimentally for the different type of display indicated in Table III while displaying dark images, bright or clear light images and auxiliary light images produced from incandescent and laser light sources of having different luminance levels:

$$\frac{\text{Voltage Potential of}}{\text{Reference Level Voltage}} = (\text{Factor 1})$$

$$\left( \begin{array}{c} \text{Maximum Voltage Potential} \\ \text{of Clear Light} \\ \text{Reflected Image signal} \end{array} - \begin{array}{c} \text{Maximum Voltage Potential} \\ \text{of Dark Light} \\ \text{Reflected Image Signal} \end{array} \right) +$$

$$\text{Factor 2} + \begin{array}{c} \text{Maximum Voltage Potential} \\ \text{of Clear Light} \\ \text{Reflected Image Signal} \end{array}$$

Figure 33:
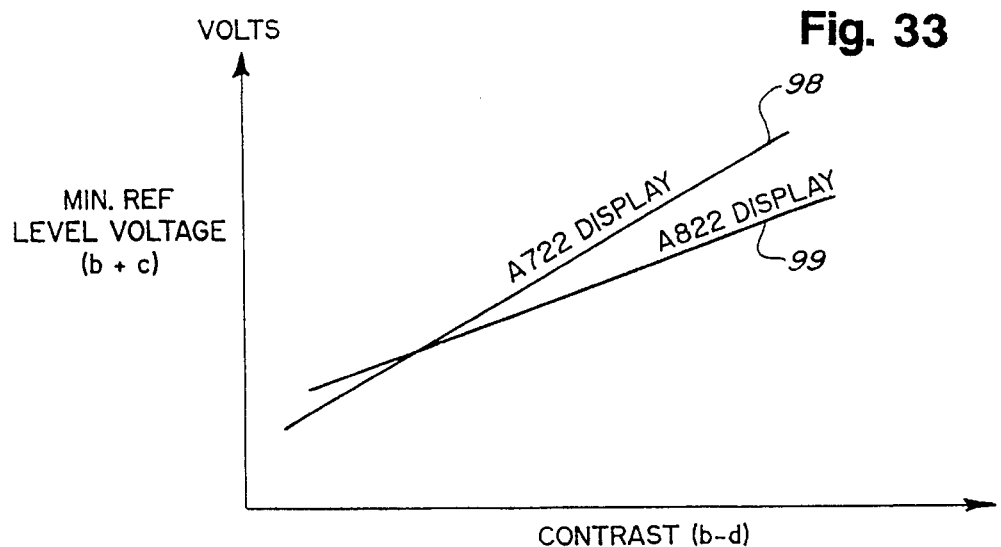
FIG. 33 is a graphical representation of reference level voltages for different contrast levels relative to given types of display device as a function of distance from a viewing screen of FIG. 1.

The above mentioned formula was derived by plotting the minimum voltage potential of the reference level signal to distinguish between a high intensity auxiliary light information beam and a low intensity auxiliary light information beam as a function of the difference between the voltage potential of the reference level when a bright image is displayed and when a dark image is displayed. FIG. 33 is a graphical representation for two of the display units listed in Table III. More particularly, the A722-is represented by a graph 98 and the A822 is represented by a graph 99. Considering the computation of the reference level voltage in greater detail with reference to FIG. 33, when Factor 1 equals one and Factor 2 equals zero the previously mentioned equation reduces to a basic formula given by:

$$y=b+c=b+(b-d)=2b-d$$

where b=the reference level voltage relative to the bright image information signal 60;

c=the difference between the reference level voltage relative to the bright image information signal 60 and the reference level voltage relative to the dark image information 61; and d=the reference level voltage relative to the dark image information signal 61.

From the basic equation (y=b+c), it can be determined readily that the low intensity auxiliary light information, indicated generally at 68, must be less than c to avoid being passed by the comparator 46 when the reference level voltage is set at y volts.

In a similar manner, it also can be determined readily that high intensity auxiliary light information, indicated generally at 69, must be greater than y in order to be passed by the comparator 46 when the reference level voltage is set at y volts. Thus, the voltage levels for the low intensity auxiliary light information 68 ($B_{LOW/MAX}$) and the high intensity auxiliary light information 69 ($B_{HIGH/MIN}$) can be expressed as follows:

Minimum Voltage for High Intensity Beam = $y - d = B_{HIGH/MIN}$

Max Voltage for Low Beam Intensity = $c = B_{LOW/MAX}$

From the foregoing it should be understood that $B_{LOW/MAX}$ must always be less than c or the voltage differences defined by the contrast of a given panel. Similarly, it should be understood that $B_{HIGH/MIN}$ must always be greater than b+c.

In order to adjust for different types of display units, the factors, Factor 1 and Factor 2 are introduced into the above mentioned basic formula as follows:

$$y=(\text{factor}2+b)+\text{factor}1(c)$$

the equation for the computed reference voltage thus becomes:

$$y=mx+z$$

where m=factor 1;

x=c=b-d; and z=b+factor 2

From the foregoing, it should be understood that the signal information for the low beam auxiliary light information will never be passed by the comparator 46.

After acquiring the factor information, the program proceeds to an instruction 477 which computes the reference level voltage based on the previously mentioned formula.

The program then proceeds to a decision instruction 478 to determine whether the computed reference level voltage exceeds the maximum permissible potential of the reference level signal 48. If the potential is not too high, the program goes to an instruction 483 which causes the reference level signal 48 to be set to the computed voltage potential. After the voltage potential of the reference level signal 48 is set, the program goes to an instruction 484 which causes a series of audible sounds of "chirp," short "beep," "chirp" followed by short "beep" to notify the user 32 the system is ready for corner location calibration. The program then goes to a call instruction 485 which calls the corner calibration routine more fully described in copending U.S. patent application Ser. No. 07/611,416.

If the potential of the reference level signal 48 is too large, the program proceeds from instruction 478 to an instruction 479, that forces the displayed image to a bright clear image. The program next executes a decision instruction 480 to determine whether a lower gain is available.

If a lower gain is not available at the decision instruction 480, the program goes to an instruction 482 which forces the potential value for the reference level signal 48 to a maximum potential.

If a lower gain is available at decision instruction 480, the program proceeds to an instruction 481 which causes the gain to be set to the next lower level. After the gain is set at the lower level, the program returns to instruction 451 and proceeds as previously described. Referring again to the instruction 482, after instruction 482 is executed the program goes to the instruction 484 and proceeds as previously described.

From the foregoing, it will be understood by those skilled in the art, that if the computed reference level voltage is greater than the range of the comparator 46, the program via the steps described in instructions 478, 479, 480 and 481 causes the gain of the amplifier arrangement 39 to be decreased in order to recalculate an appropriate potential for the reference level signal 48.

Figure 32:
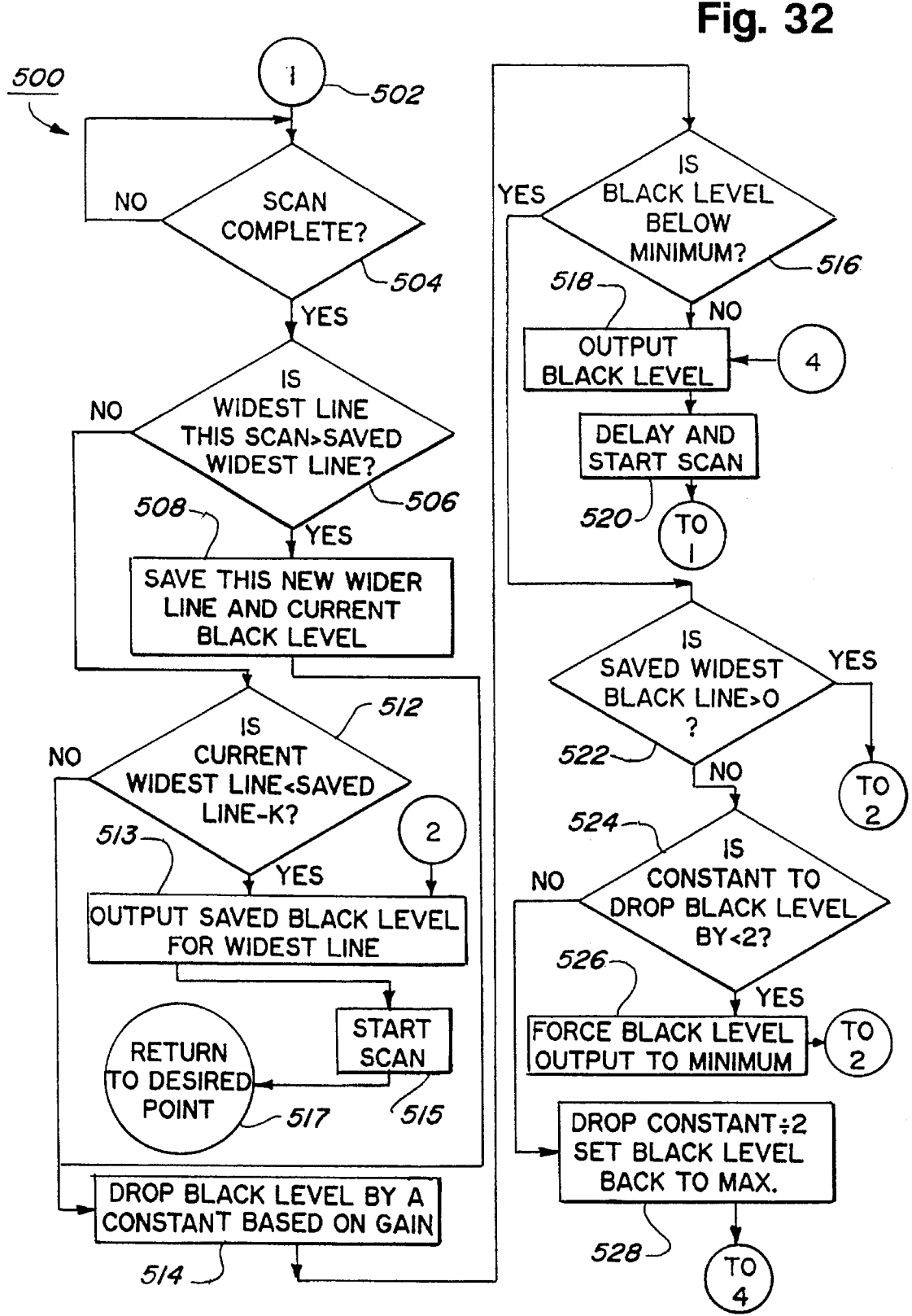

Considering now the black level set routine 500 in greater detail with reference to FIG. 32, the black level set routine 500 illustrates the steps taken by the microprocessor 42 to offset the reflected light information signal 35A so that its adjusted to the operating range of the comparator 46. The black level set routine 500 starts at a commence instruction 502 and proceeds to a decision 504 to determine whether the charge couple device 34 has completed its scan. If the scan has not been completed, the program waits at decision 504 until the scan is completed.

When the scan is completed, the program proceeds to a decision instruction 506 to determine whether the widest line detected during the last scan period, is greater than the last saved widest line. In this regard, if any part of the computer generated image 24 is detected, it will result in a scan line greater than zero.

If the widest line detected is larger than the last save line width, the program advances to an instruction 508 that causes the microprocessor 42 to save the new wider line information and the current black level setting. The program then proceeds to an instruction 514, that causes the voltage potential of black level signal 43 to be dropped by a given amount based on the present gain setting. Table II shows the relationship between gain and the black level settings.

Considering decision instruction 506 once again, if the widest line of the last performed scan, is not greater than the last saved line, the program proceeds to decision instruction 512 to determine whether the current widest line is less than, the last saved line less a constant K. If the current widest line is not, the program goes to the instruction 514 that causes the black level to be dropped by a given amount based on the gain setting. As the gain setting at this initial time is set at its lowest level, the black level is dropped by 16 levels.

TABLE II

| Gain | Amount Black Level Decreased |
| --- | --- |
| lowest | 16 |
| 2nd lowest | 12 |
| 3rd lowest | 8 |
| highest | 4 |

Considering decision 512 again, if the current widest line saved is less than the saved line minus a predetermined constant K, the program advances to an instruction 513. At the instruction 513, the black level output is saved for widest line. The program then goes to a return instruction 515 which causes the program to return to a predetermined location.

Referring once again the instruction 514, after instruction 514 is executed, the program goes to a decision instruction 516 to determine whether the black level is set at below a predetermined minimum value. If the black level is not below the minimum value, the program proceeds to instruction 518, that causes the microprocessor 42 to output the black level signal. After the black level signal 43 is generated, the program proceeds to an instruction 520 to start another scan sequence after about a 60 millisecond delay. The program then returns to the commence instruction 502 and proceeds as previously described.

At decision 516, if the black level signal 43 is set below the minimum value, the program advances to a decision 522 to determine whether the saved widest black line is greater than zero. If the widest black line is greater than zero, the program goes to instruction 513 and proceed as previously described.

If the widest black line is not greater than zero, the program goes to a decision 524 to determine whether the constant to decrease the black level is less than two. If the constant is less than two, the program proceeds to an instruction 526. At instruction 526, the black level output is set to its minimum value. From instruction 526 the program goes to instruction 513 and proceeds as previously described.

Referring again to decision instruction 524, if the constant is not less than 2, the program goes to an instruction 528 that causes the constant to be decreased and the black level signal 48 to be reset to its maximum potential. After executing instruction 528, the program goes to instruction 518 and proceeds as previously described.

Figure 4:
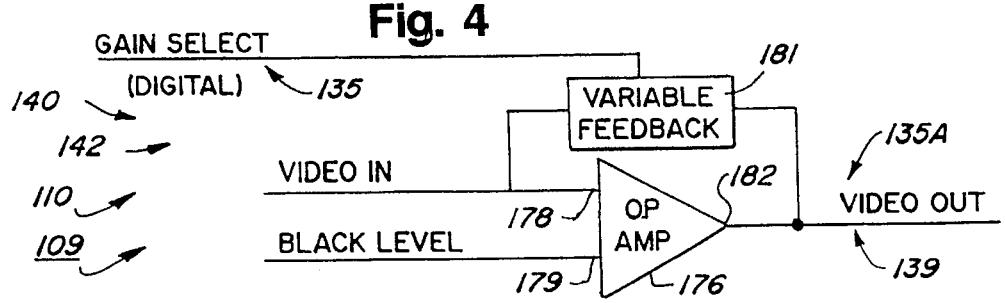
FIG. 4 is a symbolic block diagram of another calibration arrangement, which is constructed in accordance with the present invention.

Referring now to the drawings and more particularly to FIG. 4, there is shown a calibration arrangement 109 for calibrating an optical auxiliary input system 110, and which is constructed in accordance to the present invention. The optical auxiliary input system 110 is substantially similar to the optical auxiliary input system 10 and is not shown for calibration purposes.

Considering now the calibration arrangement 109 in greater detail with reference to FIG. 4, the calibration arrangement 109 includes a signal amplifier circuit 139 and a signal discrimination arrangement 140. The discrimination arrangement 140 is similar to the arrangement 40 and is not shown for clarification purposes.

Considering now the signal amplifier circuit 139 in greater detail with reference to FIG. 4, the signal amplifier circuit 139 generally includes an operational amplifier 176 having a pair of input terminals 178 and 179, and a variable feedback element 181. The variable feedback element 181 is coupled between the input terminal 178 and an output terminal 182 of the operational amplifier 176 and is controlled by a microprocessor 142 forming part of the signal discrimination arrangement 140. In this regard, the microprocessor 142 generates a gain control signal 135 that selects the gain of the operational amplifier 176 via the variable feedback element 181. The variable feedback element 181 is a digital potentiometer that enables up to four discrete gain factors to be selected.

Although in the preferred embodiment of the present invention the variable feedback element 181 is a digital potentiometer, it will be understood by those skilled in the art that other types and kinds of variable feedback elements, such as a digital to analog converter or a digital gain chip, can be employed. It should also be understood that additional amplifier stages can also be employed to provide intermediate gain levels.

As best seen in FIG. 4, the input terminal 179 is coupled to a black level signal 143 generated by the microprocessor 142. The black level signal 143, enables the output signal of the operational amplifier 176 to be offset.

Figure 5:
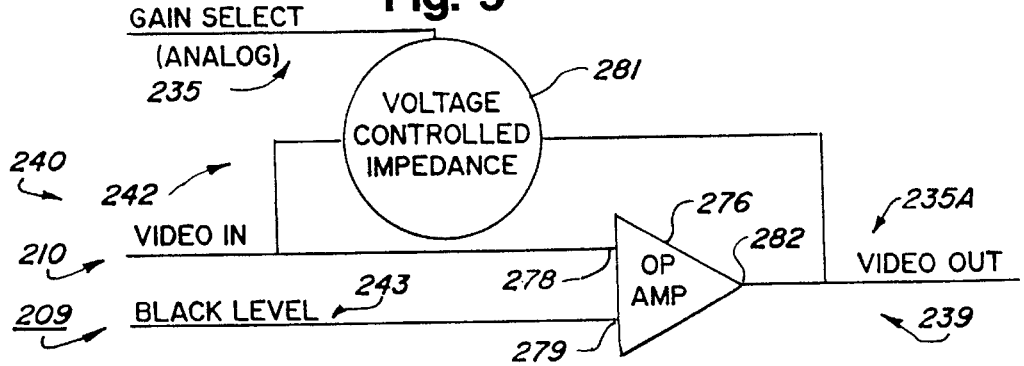
FIG. 5 is a symbolic block diagram of still yet another calibration arrangement, which is constructed in accordance with the present invention.

Referring now to the drawings and more particularly to FIG. 5, there is shown a calibration arrangement 209 for calibrating an optical auxiliary input system 210, and which is constructed in accordance with the present invention. The optical auxiliary input system 210 is substantially similar to the optical auxiliary input system 10 and is not shown for clarification purposes.

Considering now the calibration arrangement 209 in greater detail with reference to FIG. 5, the calibration arrangement 209 includes a signal amplifier circuit 239 and a signal discrimination arrangement 240. The discrimination arrangement 240 is similar to the arrangement 40 and is not shown for clarification purposes.

Considering now the signal amplifier circuit 239 in greater detail with reference to FIG. 5, the signal amplifier circuit 239 generally includes an operational amplifier 276 having a pair of input terminals 278 and 279, and a voltage controlled device 281. The voltage controlled device 281 is coupled between the input terminal 278 and an output terminal 282 of the operational amplifier 276 and is controlled by a microprocessor 242 forming part of the signal discrimination arrangement 240. In this regard, the microprocessor 242 is similar to microprocessor 42 and generates a gain control signal 235 that selects the gain of the operational amplifier 276 via the voltage control device 281. The voltage controlled device 281 is a voltage controlled impedance device that enables a plurality of gain factors to be selected.

As best seen in FIG. 5, the input terminal 279 of the operational amplifier 276 is coupled to a black level signal 243 generated by the microprocessor 242. The black level signal 243, enables the output signal of the operational amplifier 276 to be offset.

Referring now to the drawings and more particularly to FIG. 6, there is shown a calibration arrangement 309 for calibrating an optical auxiliary input system 310, and which is constructed in accordance to the present invention. The optical auxiliary input system 310 is substantially similar to the optical auxiliary input system 10 and is not shown for calibration purposes.

Considering now the calibration arrangement 309 in greater detail with reference to FIG. 6, the calibration arrangement 309 includes a signal amplifier circuit 339 and a signal discrimination arrangement 340. The discrimination arrangement 340 is similar to the arrangement 40 and is not shown for clarification purposes.

Considering now the signal amplifier circuit 339 in greater detail with reference to FIG. 6, the signal amplifier circuit 339 generally includes an operational amplifier 351 having a pair of input terminals 352 and 353 and feedback resistor 354 for high gain operation. The feedback resistor 343 is connected from the input terminal 352 to an output terminal 356 of the operational amplifier 351. One of the input terminals 352 is connected via a conductor 355, to a black level signal 343 generated by a microprocessor 342 forming part of the signal discrimination arrangement 340. The black level signal 342 functions as an offset voltage for the amplifier 351.

The other one of the input terminals 353 is connected to a voltage controlled impedance device 362 for helping to control the gain of the operational amplifier 351.

The voltage controlled impedance device 362 has a pair of input terminals 362 and 363. One of the input terminals 362 is connected to a gain select signal 347 generated by the microprocessor 342. The gain select signal 347 causes the impedance of the device 362 to be either high or low for attenuating the input signal to the amplifier 351 as will be explained hereinafter.

The other one of the input terminals 364 is connected to a reflected light information signal 335 generated via the optical auxiliary input system 310.

In operation, the feedback resistor 354 has a predetermined impedance that is selected to cause the operational amplifier 351 to have a maximum gain characteristic. The voltage controlled impedance device 362 is connected in the input path to the operational amplifier 351 as functions as an attenuator. In this regard, when the impedance of the device 362 is low, the input signal to the amplifier 351 is not attenuated and the output signal of the amplifier 351 has its maximum potential. Conversely, when the impedance of the device 362 is high, the input signal to the amplifier 351 is attenuated causing the output signal of the amplifier 351 to have its minimum potential.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A system for controlling a projected video image with auxiliary control light projected onto a viewing surface reflecting the projected video image, comprising:

means for generating a bright calibration video signal indicative of the combination of the projected video image and background light to facilitate discriminating accurately the projected video image from the background light reflecting from the viewing surface, said video signal having a minimum value and a maximum value;

means for determining the minimum value of said bright calibration video signal above a given background light level to facilitate the elimination of a portion of said video signal indicative of the background light;

means for storing the determined minimum value to facilitate modifying said video signal above said given background light level thereafter to facilitate responding to the auxiliary control light projected onto the viewing surface;

means for adjusting the value of said bright calibration video signal from said maximum value to a lesser value, said lesser value being equal to the maximum value less the stored minimum value to generate a modified video signal indicative of the projected video image only, said modified video signal having another minimum value and another maximum value; and means for adjusting the value of a reference level signal to be greater than said lesser value to distinguish a video signal indicative of an auxiliary control light image from a video signal indicative of the combination of the projected video image and background light to facilitate discrimination accurately the projected auxiliary control light from the projected video image light reflecting from the viewing surface;

whereby the auxiliary control light is enabled to control the projected liquid crystal display image when projected onto the viewing surface.

2. A system according to claim 1, comprising:

means for generating a low intensity auxiliary locating image for projecting onto the viewing surface to help a user locate a desired portion of the video image reflecting from the viewing surface;

means for generating said auxiliary light image being a high intensity auxiliary control image for projecting onto the viewing surface at substantially the same location as said location image was projected to enable the optical input system to detect the control image for calibration purposes; and discrimination means for distinguishing said signal indicative of said control image from said reference level signal for display control purposes.

3. A system according to claim 2, further comprising:

means for causing the projected video image to change between a brightest image and a darkest image to help facilitate determining the maximum and minimum values of said modified video signal relative to the projected image; and means for determining the maximum value of said modified video signal for helping to determine a value of said reference level signal sufficiently above the value of a modified video signal indicative of the combination of the low intensity locating image and the brightest image to prevent the optical input system from generating auxiliary control information in response to the system detecting the locating image on the viewing surface.

4. A system according to claim 3, further comprising:

means for storing expected boundary values of the projected video image for calibration purposes;

said expected boundary values being indicative of a range of maximum and minimum width and height values of projected images having a sufficient intensity to be detected by the optical input system;

means for determining the width and height values of the projected video image detected by the optical input system;

means for comparing the determined width and height values of the projected video image with said expected boundary values to determine if the optical input system is physically aligned with the viewing surface to detect the entire projected video image from the viewing surface; and said input system being aligned when both the determined width and height values falls within the range of the expected maximum and minimum width and height values respectively.

5. A system according to claim 4, further comprising:

means for storing factors indicative of expected luminance levels associated with different types of image projection systems to facilitate determining the value of said reference level signal;

means for retrieving the stored factors to help determine the value of said reference level signal relative to the type of image projection system generating the projected video image; and algorithm means for calculating the value of said reference level signal to distinguish said signal indicative of an auxiliary light image from said modified video signal to help the optical input system detect the control image on the viewing surface.

6. A system according to claim 5, wherein said discrimination means includes:

comparator means coupled to said reference level signal and to said modified video signal for generating a detection signal whenever the voltage of said modified video signal is greater than the voltage of said reference level signal.

7. A system according to claim 6, wherein said algorithm means includes a formula:

$$y=mx+b;$$

wherein y is a minimum voltage potential value for said reference level signal to enable said comparator means to distinguish between a modified video signal indicative of the combination of said low intensity image and the brightest image and a modified video signal indicative of the combination of said high intensity image and the darkest image;

wherein x is the potential difference between a bright image reference level signal and a dark image reference level signal;

wherein b is the potential value of said bright image reference level signal; and wherein m is a constant indicative of a luminance level for one of a plurality of different kinds of image projection systems.

8. A system according to claim 7, wherein said means for decreasing includes:

means for changing the strength of said video signal to facilitate detection of the video image and the control image under different background light conditions; and multiple gain means responsive to said modified video signal for changing the strength of said modified video signal to further facilitate detection of the video image and the control image under different background light conditions.

9. A system according to claim 3, wherein said means for determining includes gain level factor means responsive to a gain selection signal for determining a gain factor to adjust the value of said light information signal to a sufficient value to enable it to be compared with said reference level signal.

10. A system according to claim 9, wherein said means for determining further includes black level factor means responsive to a black level signal for determining a black level factor to eliminate substantially ambient background noise from an information signal including said auxiliary light information signals.

11. A system according to claim 10, wherein said mean for determining further includes reference level factor means responsive to a reference level signal to help distinguish between different types of auxiliary light information signals.

12. A system according to claim 11, wherein said mean for determining further includes:

means for generating said black level signal, said gain selection signal and said reference level signal.

13. A system according to claim 1, for use with means for generating video information signals to help produce said video image, further comprising:

means for determining the boundary values of said projected video image reflecting from the viewing surface; and means coupled to the last mentioned generating means for converting said boundary values to video signal coordinate values to help facilitate changing said video image in response to said control image reflecting from the viewing surface at a user selected portion of the projected image.

14. A method for controlling a projected video image with auxiliary control light projected onto a viewing surface reflecting the projected video image, comprising:

generating a bright calibration video signal indicative of the combination of the projected video image and background light to facilitate discriminating accurately the projected video image from the background light reflecting from the viewing surface, said video signal having a minimum value and a maximum value;

determining the minimum value of said bright calibration video signal above a given background light level to facilitate the elimination of a portion of said video signal indicative of the background light;

storing the determined minimum value to facilitate modifying said video signal above said given background light level thereafter to facilitate responding to the auxiliary control light projected onto the viewing surface;

adjusting the value of said bright calibration video signal from said maximum value to a lesser value, said lesser value being equal to the maximum value less the stored minimum value to generate a modified video signal indicative of the projected video image only, said modified video signal having a minimum value and a maximum value; and adjusting the value of a reference level signal to be greater than said lesser value to distinguish a video signal indicative of an auxiliary control light image from a video signal indicative of the combination of the projected video image and background light to facilitate discriminating accurately the projected auxiliary control light from the projected video image light reflecting from the viewing surface;

whereby the auxiliary control light is enabled to control the projected liquid crystal display image when projected onto the viewing surface.

15. A method according to claim 14, comprising:

generating a low intensity auxiliary locating image for projecting onto the viewing surface to help a user locate a desired portion of the video image reflecting from the viewing surface;

generating said auxiliary light image being a high intensity auxiliary control image for projecting onto the viewing surface at substantially the same location as said locating image was projected to enable the optical input system to detect the control image for calibration purposes; and distinguishing said signal indicative of said control image from said reference level signal for display control purposes.

16. A method according to claim 15, further comprising:

causing the projected video image to change between a brightest image and a darkest image to help facilitate determining the maximum and minimum values of said modified video signal relative to the projected image; and determining the maximum value of said modified video signal for helping to determine a value of said reference level signal sufficiently above the value of a modified video signal indicative of the combination of the low intensity locating image and the brightest image to prevent the optical input system from generating auxiliary control information in response to the system detecting the locating image on the viewing surface.

17. A method according to claim 16, further comprising:

storing expected boundary values of the projected video image for calibration purposes;

said expected boundary values being indicative of a range of maximum and minimum width and height values of projected images having a sufficient intensity to be detected by the optical input system;

determining the width and height values of the projected video image detected by the optical input system;

comparing the determined width and height values of the projected video image with said expected boundary values to determine if the optical input system is physically aligned with the viewing surface to detect the entire projected video image from the viewing surface; and said input system being sufficiently aligned when both the determined width and height values falls within the range of the expected maximum and minimum width and height values respectively.

18. A method according to claim 17, further comprising:

storing factors indicative of expected luminance levels associated with different types of image projection systems to facilitate determining the value of said reference level signal;

retrieving the stored factors to help determine the value of said reference level signal relative to the type of image projection system generating the projected video image; and calculating the value of said reference level signal to distinguish said signal indicative of an auxiliary light image from said modified video signal to help the optical input system detect the control image on the viewing surface.

19. A method according to claim 18, wherein said step of distinguishing includes:

generating a detection signal whenever the voltage of said video signal is greater than said reference level signal; and wherein said step of calculating includes a formula:

$$y=mx+b$$

wherein y is a minimum voltage potential value for said reference level signal to enable comparator means to distinguish between a modified video signal indicative of the combination of said low intensity image and the bright image and a modified video signal indicative of the combination of said high intensity image and the dark image;

wherein x is the potential difference between a bright image reference level signal and a dark image reference level signal;

wherein b is the potential value of said bright image reference level signal; and wherein m is a constant indicative of a luminance level for one of a plurality of different kinds of image projection systems.

20. A method according to claim 19, wherein said step of decreasing includes:

using video sensing means for generating said video signal, said video sensing means responsive to an exposure rate signal for changing the value of said video signal;

adjusting the exposure rate to change the strength of said video signal to facilitate detection of the video image under different background light conditions.

21. A method according to claim 20, further comprising:

setting said exposure rate signal initially to a minimum value;

determining whether said modified video signal is generated in response to said video signal;

increasing the value of said exposure rate signal by an incremental value when said modified video signal is not generated in response to said video signal; and repeating the steps of setting, determining and increasing said exposure rate signal until said modified video signal is generated in response to said video signal.

22. A method according to claim 21, further comprising:

using gain means for changing the value of said video signal, said gain means responsive to a gain control signal for changing the value of said video signal;

setting said gain control signal initially to a maximum value;

determining whether said modified video signal is generated in response to said video signal when said exposure rate signal is set at a maximum value;

decreasing the value of said gain control signal by an incremental amount when said modified video signal is generated in response to said video signal;

repeating the steps of setting, determining and decreasing said gain control signal until said modified video signal is not generated in response to said video signal.

23. A method according to claim 22, further comprising:

determining whether said exposure rate signal is set at a maximum value;

determining whether said gain control signal is set at a maximum value;

generating an alarm indication when said modified value signal is not generated when said rate signal and said control signal are set to the maximum values;

setting said exposure rate signal to said minimum value when said modified video signal is generated when said rate signal and said control signal are set to their maximum values;

increasing said exposure rate signal by said incremental value;

determining whether said modified video signal is generated in response to said video signal;

repeating the last two mentioned steps until said modified video signal is generated in response to said video signal.

24. A method according to claim 23, further comprising:

using comparator means for generating an information signal to change the liquid crystal image reflecting from the viewing surface, said computer means being responsive to said modified video signal and to a reference level signal; and setting said reference level signal to a minimum value.

25. A method according to claim 24, further comprising:

setting said reference level signal to a maximum value; and generating a video signal indicative of a bright image.

26. A method according to claim 25, further comprising:

determining whether said information signal is generated in response to said video signal;

decreasing the value of said reference level signal by a large incremental value when it is determined said information signal is not generated;

repeating the last two mentioned steps of determining and decreasing until said information signal is generated;

increasing the value of said reference level signal by said large incremental value;

storing the value of said reference level signal;

decreasing the value of said reference level signal by a small incremental value;

determining whether said information signal is generated;

repeating the last two mentioned steps until said information signal is generated; and storing the value of said reference level signal as a bright image reference level.

27. A method according to claim 26, further comprising:

setting said reference level signal to a maximum value; and generating a video signal indicative of a dark image.

28. A method according to claim 27, further comprising:

determining whether said information signal is generated in response to said video signal;

decreasing the value of said reference level signal by a large incremental value when it is determined said information signal is not generated;

repeating the last two mentioned steps of determining and decreasing until said information signal is generated;

increasing the value of said reference level signal by said large incremental value;

storing the value of said reference level signal;

decreasing the value of said reference level signal by a small incremental value;

determining whether said information signal is generated;

repeating the last two mentioned steps until said information signal is generated; and storing the value of said reference level signal as a dark image reference level.

29. A system for calibrating an optical computer input system to facilitate the modifying of a video image generated by computer means displayed by display means and projected onto a viewing surface by projection means, comprising:

light sensing means having a field of view that is substantially larger than said video image reflecting from the viewing surface and being mounted for movement relative to the viewing surface and the projection means so that said field of view is able to capture all of the video image reflecting from the viewing surface for generating a reflected light information signal indicative of the luminance levels of the light images reflecting from the viewing surface;

signal processing means coupled to the computer and said light sensing means for converting said reflected light information signal into computer coordinate information to modify the video image generated by the computer means;

signal calibration means for automatically adjusting the strength of said reflected light information signal for different background lighting conditions to enable said signal processing means to accurately process said signal so that it is reliably converted into computer coordinate information to modify the video image generated by the computer means;

said signal calibration means including discrimination means for facilitating comparing signals indicative of a plurality of light images having a plurality of different luminance levels reflecting from the viewing surface; and microprocessor means for controlling said discrimination means to enable the comparison between light images indicative of said video image reflecting from the viewing surface and light images indicative of externally generated spots of control light reflecting from the viewing surface;

wherein the reflected light images indicative of said video image having different luminance levels ranging between a maximum luminance level and a minimum luminance level.

30. A system according to claim 29, wherein said signal calibration means further includes:

signal amplifying means for increasing the strength of the reflected light information signal to facilitate discriminating between signals indicative of the various light images reflecting from the viewing surface;

wherein the reflected light images indicative of said video image having different luminance levels ranging between a maximum luminance level and a minimum luminance level; and wherein the reflected light images indicative of said control light have at least two different luminance levels to help facilitate directing the control light to desired locations on the video image without generating said reflected light information signal.

31. A system according to claim 30, wherein the projection means has optical properties for projecting the video image through a particular optical path onto the viewing surface to be reflected therefrom; and wherein said viewing surface is disposed in a room having ambient light therein;

said optical properties of the projection means in combination with the ambient light and the distance the viewing surface is disposed from the projection means causing the light images reflecting from the viewing surface to have maximum and minimum luminance levels relative to one another;

wherein said microprocessor means includes reference level signal means for generating a reference level signal and a black level signal to help facilitate discrimination between signals indicative of the various light images reflecting from the viewing surface; and wherein said discrimination means includes comparator means responsive to said reference level signal to enable the accurate comparison of the various light images reflecting from the viewing surface relative to ambient light conditions and the optical properties of the projection means.

32. A system according to claim 31, wherein said at least two different luminance levels including a positioning luminance level that will not be processed as being indicative of a control signal to modify the video image and a processing luminance level that will be processed as being indicative of a control signal to modify the video image.

33. A system according to claim 32, wherein said microprocessor means includes exposure time means for generating an exposure time signal to help said light sensing means to generate said reflected light information signal, said exposure time signal having a maximum duration time period and a minimum duration time period to permit the duration of said light information signal to be controlled for signal processing purposes;

wherein said light sensing means is responsive to said exposure time signal to enable said light information signal to be generated in response to light images of a given luminance level;

wherein said microprocessor means includes signal strength means for generating a gain selection signal to control the strength of said reflected light information signal for signal processing purposes; and wherein said signal amplifying means is responsive to said given selection signal to enable discrimination between the signals indicative of the various light images reflecting from the viewing surface.

34. A system according to claim 33, wherein said microprocessor means includes a plurality of calibration algorithms to help facilitate the alignment of said light sensing means relative to the proper detection of said reflected video image and said reflected control image when it is superimposed on said reflected video image.

35. A system according to claim 34, wherein said plurality of calibration algorithms includes:

field of view algorithm means for user interactive alignment of the light sensing means under normal ambient light and harsh ambient light conditions; and light sensitivity algorithm means for adjusting the light sensitivity of said signal calibration means to facilitate detection and tracking of certain ones of the externally generated spots of control light reflecting from the viewing surface.

36. A system according to claim 35, wherein said field of view algorithm means includes:

signal detection means responsive to said light information signal for selecting the duration of said exposure time signal, said exposure time signal being incremental relative to said gain selection signal from said minimum duration time period to a duration time period sufficient to cause said light sensing means to generate an output signal of sufficient magnitude to permit signal processing and for causing the gain selection signal to be increased from a minimum gain selection level to a maximum gain selection level for each selected duration of the exposure time signal until said light sensing means generates said output signal of sufficient magnified to permit signal processing.

37. A system according to claim 36, wherein said field of view algorithm means further includes reference level means for selecting a desired one of a plurality of different reference level sufficient to enable said output signal to be discriminated;

said desired reference level being set at about zero to enable the selection of exposure time and gain selection signal levels.

38. A system according to claim 37, wherein said microprocessor means includes storage means for storing camera coordinate information indicative of the size of a captured video image and for storing predetermined camera coordinate information indicative of expected maximum and minimum camera coordinate values of the video image reflecting from the viewing surface.

39. A system according to claim 35, wherein said light sensitivity algorithm includes:

reference level factor means responsive to said reference level signal for determining a reference level factor to help distinguish between different types of auxiliary light information signals;

black level factor means responsive to said black level signal for determining a black level factor to eliminate substantially ambient background noise from an information signal including said auxiliary light information signals; and gain level factor means responsive to gain selection signal for determining a gain factor to adjust the value of said light information signal to a sufficient value to enable it to be compared with said reference level signal.

\* \* \* \* \*

UNITED STATES PATENT AND TRADEMARK OFFICE
CERTIFICATE OF CORRECTION

PATENT NO. : 5,594,468
DATED : January 14, 1997
INVENTOR(S) : Roger N. Marshall, et al It is certified that error appears in the above-indentified patent and that said Letters Patent is hereby corrected as shown below:

On the title page: Item [75]line 3, delete "Sante", and substitute therefor --Santee--.

Signed and Sealed this

Seventeenth Day of June, 1997

Attest:

BRUCE LEHMAN

Attesting Officer

Commissioner of Patents and Trademarks